(12) United States Patent
Pham Van et al.

(10) Patent No.: US 12,444,092 B2
(45) Date of Patent: Oct. 14, 2025

(54) CODING POINT CLOUD DATA USING DIRECT MODE FOR INTER-PREDICTION IN G-PCC

(71) Applicant: QUALCOMM Incorporated, San Diego, CA (US)

(72) Inventors: Luong Pham Van, San Diego, CA (US); Geert Van der Auwera, San Diego, CA (US); Adarsh Krishnan Ramasubramonian, Irvine, CA (US); Marta Karczewicz, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 407 days.

(21) Appl. No.: 17/933,300

(22) Filed: Sep. 19, 2022

(65) Prior Publication Data
US 2023/0099908 A1 Mar. 30, 2023

Related U.S. Application Data

(60) Provisional application No. 63/261,722, filed on Sep. 27, 2021.

(51) Int. Cl.
*G06T 9/40* (2006.01)
*G06T 9/00* (2006.01)
(Continued)

(52) U.S. Cl.
CPC ............... *G06T 9/40* (2013.01); *G06T 9/004* (2013.01); *H04N 19/103* (2014.11);
(Continued)

(58) Field of Classification Search
CPC ........... G06T 9/40; G06T 9/004; G06T 9/001; G06T 2207/10028; H04N 19/70;
(Continued)

(56) References Cited

U.S. PATENT DOCUMENTS

| 11,910,021 B2 * | 2/2024 | Pham Van | H04N 19/96 |
| 2019/0045196 A1 * | 2/2019 | Lei | H04N 19/436 |

(Continued)

FOREIGN PATENT DOCUMENTS

| WO | WO-2020055291 A1 * | 3/2020 | | H04N 19/11 |
| WO | WO-2021029720 A1 * | 2/2021 | | H04N 19/593 |

(Continued)

OTHER PUBLICATIONS

Gao et al., Point Cloud Compression: Technologies and Standardization, 2024 [retrieved Nov. 30, 2024], Springer Singapore, Edition No. 1, 264 pages. https://doi.org/10.1007/978-981-97-1957-0 (Year: 2024).*

(Continued)

*Primary Examiner* — Henok Shiferaw
*Assistant Examiner* — Dennis Rosario
(74) *Attorney, Agent, or Firm* — Shumaker & Sieffert, P. A.

(57) ABSTRACT

An example device for coding point cloud data includes a memory configured to store point cloud data; and one or more processors implemented in circuitry and configured to: determine at least one of 1) that a node of an octree of the point cloud data is not inter predictable or 2) that angular mode is enabled for the node; in response to determining the at least one of 1) that the node is not inter predictable or 2) that angular mode is enabled for the node, determine an inferred direct coding mode (IDCM) mode for the node; and code occupancy data of the node using the determined IDCM mode.

22 Claims, 13 Drawing Sheets

(51) Int. Cl.
     H04N 19/103   (2014.01)
     H04N 19/11    (2014.01)
     H04N 19/159   (2014.01)
     H04N 19/50    (2014.01)
     H04N 19/70    (2014.01)
     H04N 19/96    (2014.01)
(52) U.S. Cl.
     CPC ........... H04N 19/11 (2014.11); H04N 19/159 (2014.11); H04N 19/50 (2014.11); H04N 19/70 (2014.11); H04N 19/96 (2014.11); *G06T 2207/10028* (2013.01)
(58) Field of Classification Search
     CPC ...... H04N 19/96; H04N 19/159; H04N 19/11; H04N 19/103; H04N 19/50
     See application file for complete search history.

(56) References Cited

U.S. PATENT DOCUMENTS

2021/0385485 A1* 12/2021 Liao ............... H04N 19/105
2022/0353549 A1* 11/2022 Lasserre .......... H04N 19/167

FOREIGN PATENT DOCUMENTS

WO      2021084292  A1     5/2021
WO   WO-2022250276  A1  * 12/2022

OTHER PUBLICATIONS

Zheng et al., Assessing the Contribution of Woody Materials to Forest Angular Gap Fraction and Effective Leaf Area Index Using Terrestrial Laser Scanning Data, Oct. 19, 2015: 1st avaiable [retrieved Mar. 29, 2025], (Year: 2016) IEEE Transactions on Geoscience and Remote Sensing, vol. 54, Issue: 3, Mar. 2016, pp. 1475-1487. DOI: 10.1109/TGRS.2015.2481492 (Year: 2016).*
Park et al., Definition and method on PU for using palette mode: KR 10-2021-0069309: foreign priority of WO 2022/250276 A1, filed May 28, 2021 [retrieved Mar. 31, 2025], 57 pages. Retrieved: https://register.epo.org/ipfwretrieve?apn=KR.2022004569.W&lng=en ( Year: 2021).*
Cao, 3D point cloud compression (thesis), Institut Polytechnique de Paris, Jan. 13, 2022 [retrieved Mar. 29, 2025], version 1, 165 pages. Retrieved: https://theses.hal.science/tel-03524521/ (Year: 2021).*
Google Translate, Machine Translation of KR 10-2021-0069309 of WO 2022/250276 A1, translated Mar. 31, 2025, 59 pages. (Year: 2025).*
3DG: "G-PCC Codec Description v6", Coding of Moving Pictures and Audio, ISO/IEC JTC1/SC29/WG11, N19091, Jan. 2020, Brussels, BE, Mar. 27, 2020, 92 pages.
Auwera G.V.D., et al., "[GPCC] [New] Planar and Azimuthal Coding Mode Simplifications", 131. MPEG Meeting, Jun. 29, 2020-Jul. 3, 2020, Online, (Motion Picture Expert Group or ISO/IEC JTC1/SC29/WG11), No. m54694, Jul. 1, 2020 (Jul. 1, 2020), XP030289263, 7 Pages.
Auwera (Qualcomm) G.V.D., et al., "[GPCC] [New Proposal] Angular Mode Simplifications and HLS Refinements", 130. MPEG Meeting, Apr. 20, 2020-Apr. 24, 2020, Alpbach, (Motion Picture Expert Group or ISO/IEC JTC1/SC29/WG11), No. m53693, Apr. 15, 2020, XP030287372, 12 Pages.
"G-PCC codec Description", 134. MPEG Meeting, Apr. 26, 2021-Apr. 30, 2021, Online, (Motion Picture Expert Group or ISO/IEC JTC1/SC29/WG11), No. n20351, Jul. 6, 2021, XP030297508, 151 Pages.

"Information Technology—MPEG-I (Coded Representation of Immersive Media)—Part 9: Geometry-based Point Cloud Compression", ISO/IEC 23090-9:2020(E), ISO/IEC JTC 1/SC 29/WG 11, 2020, 127 pages.
International Search Report and Written Opinion—PCT/US2022/076704—ISA/EPO—Jan. 2, 2023, 14 Pages.
ITU-T H.265: "Series H: Audiovisual and Multimedia Systems Infrastructure of Audiovisual Services—Coding of Moving Video", High Efficiency Video Coding, the International Telecommunication Union, Jun. 2019, 696 Pages.
Lasserre (Blackberry) S., et al., "[GPCC] [CE 13.22 Related] An Improvement of the Planar Coding Mode", 128. MPEG Meeting, Oct. 7, 2019-Oct. 11, 2019, Geneva, (Motion Picture Expert Group or ISO/IEC JTC1/SC29/WG11), No. m50642, Oct. 2, 2019, XP030221087, 3 Pages.
Lasserre (Blackberry) S., et al., "[GPCC] [CE13.22 Related] on Decoupling Planar and IDCM in Angular Mode", 130. MPEG Meeting, Apr. 20, 2020-Apr. 24, 2020, Alpbach, (Motion Picture Expert Group or ISO/IEC JTC1/SC29/ WG11), No. m52956, Mar. 3, 2020, XP030285275, XP030285276, 16 Pages.
Lasserre (Blackberry), S., et al., "M52958 [GPCC] [CE 13. 22] Report on Azimuthal Coding Mode", 130. MPEG Meeting, Apr. 20, 2020-Apr. 24, 2020, Alpbach, (Motion Picture Expert Group or ISO/IEC JTC1/SC29/WG11), No. m52958 Mar. 18, 2020, XP030285279, 3 Pages.
Lasserre (Blackberry) S., et al., "The New Azimuthal Coding Mode", [GPCC][CE13.22 related], 129. MPEG Meeting, Jan. 13, 2020-Jan. 17, 2020, Brussels, (Motion Picture Expert Group or ISO/IEC JTC1/SC29/WG11), No. m51596, Jan. 8, 2020, XP030224661, 31 Pages.
Lasserre S., (Blackberry) et al., "[GPCC] [Ce 13.22 ] Report on Angular Coding Mode", 129. MPEG Meeting, Jan. 13, 2020-Jan. 17, 2020, Brussels, (Motion Picture Expert Group or ISO/IEC JTC1/SC29/WG11). No. M51594, Jan. 8, 2020, XP030224657, 4 Pages.
Lasserre S., et al., "m48906_Planar Mode in Octree-Based Geometry Coding", 127. MPEG Meeting, Jul. 8, 2019-Jul. 12, 2019, Gothenburg, (Motion Picture Expert Group or ISO/IEC JTC1/SC29/WG11) No. m48906, Jul. 3, 2019 (Jul. 3, 2019), XP030222328, 33 Pages.
Lasserre S., "Exploratory Model for Inter-Prediction in G-PCC", 124. MPEG Meeting, Oct. 8, 2018-Oct. 12, 2018, MACAO, (Motion Picture Expert Group or ISO/IEC JTC1/SC29/WG11), No. n18096, Oct. 31, 2018, XP030193470, 4 Pages.
"Technologies Under Consideration in G-PCC", 135. MPEG Meeting, Jul. 12, 2021-Jul. 16, 2021, Online, (Motion Picture Expert Group or ISO/IEC JTC1/SC29/WG11), No. N20648, Aug. 19, 2021, XP030297555, sections 4-5.1, 44 Pages.
Van L. P., et al., "[G-PCC] [EE13.2 Test 1]: InterEM with Planar Mode Enabled", 135. MPEG Meeting, Jul. 12, 2021-Jul. 16, 2021, Online, Motion Picture Expert Group or ISO/IEC JTC1/SC29/WG11, No. m57286, Jul. 3, 2021, 8 Pages.
Van L.P (Qualcomm)., et al., "[G-PCC] EE13.2 Test 1: InterEM Version 3 with Angular Mode Enabled", 136. MPEG Meeting, Oct. 11, 2021-Oct. 15, 2021, Online, (Motion Picture Expert Group or ISO/IEC JTC1/SC29/WG11), No. m58126, Oct. 5, 2021, XP030298842, 4 Pages.
Van L.P (Qualcomm)., et al., "[G-PCC] [Inter-EM] Inter prediction for Octree Geometry Coding: Evaluation and Refinements", 138. MPEG Meeting, Apr. 25, 2022-Apr. 29, 2022, Online, (Motion Picture Expert Group or ISO/IEC JTC1/ SC29/WG11), No. m59619, Apr. 25, 2022, XP030301813, 11 Pages.

* cited by examiner

CODING POINT CLOUD DATA USING DIRECT MODE FOR INTER-PREDICTION IN G-PCC

This application claims the benefit of U.S. Provisional 63/261,722, filed Sep. 27, 2021, the entire contents of which are hereby incorporated by reference.

TECHNICAL FIELD

This disclosure relates to point cloud encoding and decoding.

BACKGROUND

A point cloud is a collection of points in a 3-dimensional space. The points may correspond to points on objects within the 3-dimensional space. Thus, a point cloud may be used to represent the physical content of the 3-dimensional space. Point clouds may have utility in a wide variety of situations. For example, point clouds may be used in the context of autonomous vehicles for representing the positions of objects on a roadway. In another example, point clouds may be used in the context of representing the physical content of an environment for purposes of positioning virtual objects in an augmented reality (AR) or mixed reality (MR) application. Point cloud compression is a process for encoding and decoding point clouds. Encoding point clouds may reduce the amount of data required for storage and transmission of point clouds.

SUMMARY

In general, this disclosure describes techniques for coding point cloud data using direct mode, e.g., for inter prediction coding of geometry point cloud compression (G-PCC). In particular, this disclosure describes techniques for coding occupancy data for a node directly, e.g., coding positions of points of a node of an octree directly, coding positions of points of the node as being the same as positions of points in a reference node for the node, or coding the positions of the points of the node according to position offsets (or residuals) relative to the positions of the points in the reference node. The coding mode may be an inferred direct coding mode (IDCM). The G-PCC coder may determine that IDCM mode is enabled for a node when at least one of the node is not inter predictable or angular mode is enabled for the node. Thus, the G-PCC coder may determine that IDCM is disabled for a node that is inter predictable and for which angular mode is not enabled.

In one example, a method of coding point cloud data includes determining at least one of 1) that a node of an octree of point cloud data is not inter predictable or 2) that angular mode is enabled for the node; in response to determining the at least one of 1) that the node is not inter predictable or 2) that angular mode is enabled for the node, determining an inferred direct coding mode (IDCM) mode for the node; and coding occupancy data of the node using the determined IDCM mode.

In another example, a device for coding point cloud data includes a memory configured to store point cloud data; and one or more processors implemented in circuitry and configured to: determine at least one of 1) that a node of an octree of the point cloud data is not inter predictable or 2) that angular mode is enabled for the node; in response to determining the at least one of 1) that the node is not inter predictable or 2) that angular mode is enabled for the node, determine an inferred direct coding mode (IDCM) mode for the node; and code occupancy data of the node using the determined IDCM mode.

In another example, a computer-readable storage medium has stored thereon instructions that, when executed, cause a processor to: determine at least one of 1) that a node of an octree of point cloud data is not inter predictable or 2) that angular mode is enabled for the node; in response to determining the at least one of 1) that the node is not inter predictable or 2) that angular mode is enabled for the node, determine an inferred direct coding mode (IDCM) mode for the node; and code occupancy data of the node using the determined IDCM mode.

In another example, device for coding point cloud data includes means for determining at least one of 1) that a node of an octree of point cloud data is not inter predictable or 2) that angular mode is enabled for the node; means for determining an inferred direct coding mode (IDCM) mode for the node in response to determining the at least one of 1) that the node is not inter predictable or 2) that angular mode is enabled for the node; and means for coding occupancy data of the node using the determined IDCM mode.

The details of one or more examples are set forth in the accompanying drawings and the description below. Other features, objects, and advantages will be apparent from the description, drawings, and claims.

DETAILED DESCRIPTION

In general, this disclosure describes techniques related to point cloud coding (encoding and/or decoding). Point cloud coding generally includes recursively partitioning a three-dimensional space into nodes and coding data indicating whether the nodes are occupied by one or more points. Attribute data may also be coded for the points. When coding occupancy data for a node (i.e., whether or not the data is occupied by at least one point), various modes may be used, such as intra-prediction, inter-prediction, angular mode, or inferred direct coding mode (IDCM). This disclosure recognizes that coding occupancy of a node using IDCM may involve a relatively high overhead bit cost. Thus, this disclosure describes techniques for limiting the use of IDCM to times when IDCM is appropriate. For example, if a node is inter predictable, occupancy of the node may be more efficiently coded using inter-prediction. As another example, this disclosure recognizes that when angular mode is enabled for the node, the overhead of IDCM data is significantly reduced. Thus, this disclosure describes techniques for enabling IDCM when a node is not inter predictable or when angular mode is enabled for the node. When IDCM is enabled for a node, IDCM may be used to code occupancy data for the node.

Figure 1:
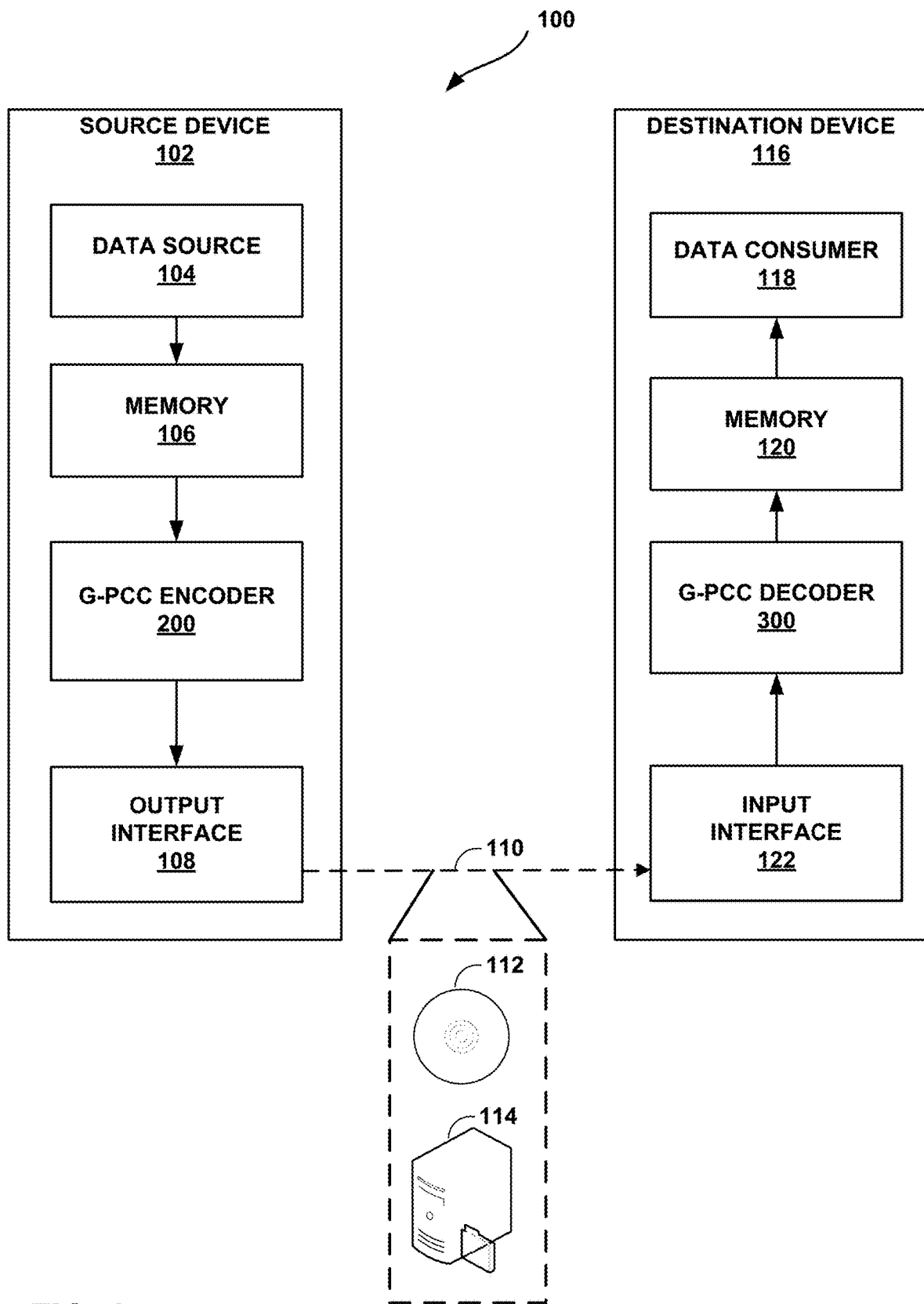
FIG. 1 is a block diagram illustrating an example encoding and decoding system that may perform the techniques of this disclosure.

FIG. 1 is a block diagram illustrating an example encoding and decoding system 100 that may perform the techniques of this disclosure. The techniques of this disclosure are generally directed to coding (encoding and/or decoding) point cloud data, i.e., to support point cloud compression. In general, point cloud data includes any data for processing a point cloud. The coding may be effective in compressing and/or decompressing point cloud data.

As shown in FIG. 1, system 100 includes a source device 102 and a destination device 116. Source device 102 provides encoded point cloud data to be decoded by a destination device 116. Particularly, in the example of FIG. 1, source device 102 provides the point cloud data to destination device 116 via a computer-readable medium 110. Source device 102 and destination device 116 may comprise any of a wide range of devices, including desktop computers, notebook (i.e., laptop) computers, tablet computers, set-top boxes, telephone handsets such as smartphones, televisions, cameras, display devices, digital media players, video gaming consoles, video streaming devices, terrestrial or marine vehicles, spacecraft, aircraft, robots, LIDAR devices, satellites, or the like. In some cases, source device 102 and destination device 116 may be equipped for wireless communication.

In the example of FIG. 1, source device 102 includes a data source 104, a memory 106, a G-PCC encoder 200, and an output interface 108. Destination device 116 includes an input interface 122, a G-PCC decoder 300, a memory 120, and a data consumer 118. In accordance with this disclosure, G-PCC encoder 200 of source device 102 and G-PCC decoder 300 of destination device 116 may be configured to apply the techniques of this disclosure related to coding point cloud data in direct mode. Thus, source device 102 represents an example of an encoding device, while destination device 116 represents an example of a decoding device. In other examples, source device 102 and destination device 116 may include other components or arrangements. For example, source device 102 may receive data (e.g., point cloud data) from an internal or external source. Likewise, destination device 116 may interface with an external data consumer, rather than include a data consumer in the same device.

System 100 as shown in FIG. 1 is merely one example. In general, other digital encoding and/or decoding devices may perform the techniques of this disclosure related to coding point cloud data in direct mode. Source device 102 and destination device 116 are merely examples of such devices in which source device 102 generates coded data for transmission to destination device 116. This disclosure refers to a "coding" device as a device that performs coding (encoding and/or decoding) of data. Thus, G-PCC encoder 200 and G-PCC decoder 300 represent examples of coding devices, in particular, an encoder and a decoder, respectively. In some examples, source device 102 and destination device 116 may operate in a substantially symmetrical manner such that each of source device 102 and destination device 116 includes encoding and decoding components. Hence, system 100 may support one-way or two-way transmission between source device 102 and destination device 116, e.g., for streaming, playback, broadcasting, telephony, navigation, and other applications.

In general, data source 104 represents a source of data (i.e., raw, unencoded point cloud data) and may provide a sequential series of "frames") of the data to G-PCC encoder 200, which encodes data for the frames. Data source 104 of source device 102 may include a point cloud capture device, such as any of a variety of cameras or sensors, e.g., a 3D scanner or a light detection and ranging (LIDAR) device, one or more video cameras, an archive containing previously captured data, and/or a data feed interface to receive data from a data content provider. Alternatively or additionally, point cloud data may be computer-generated from scanner, camera, sensor or other data. For example, data source 104 may generate computer graphics-based data as the source data, or produce a combination of live data, archived data, and computer-generated data. In each case, G-PCC encoder 200 encodes the captured, pre-captured, or computer-generated data. G-PCC encoder 200 may rearrange the frames from the received order (sometimes referred to as "display order") into a coding order for coding. G-PCC encoder 200 may generate one or more bitstreams including encoded data. Source device 102 may then output the encoded data via output interface 108 onto computer-readable medium 110 for reception and/or retrieval by, e.g., input interface 122 of destination device 116.

Memory 106 of source device 102 and memory 120 of destination device 116 may represent general purpose memories. In some examples, memory 106 and memory 120 may store raw data, e.g., raw data from data source 104 and raw, decoded data from G-PCC decoder 300. Additionally or alternatively, memory 106 and memory 120 may store software instructions executable by, e.g., G-PCC encoder 200 and G-PCC decoder 300, respectively. Although memory 106 and memory 120 are shown separately from G-PCC encoder 200 and G-PCC decoder 300 in this example, it should be understood that G-PCC encoder 200 and G-PCC decoder 300 may also include internal memories for functionally similar or equivalent purposes. Furthermore, memory 106 and memory 120 may store encoded data, e.g., output from G-PCC encoder 200 and input to G-PCC decoder 300. In some examples, portions of memory 106 and memory 120 may be allocated as one or more buffers, e.g., to store raw, decoded, and/or encoded data. For instance, memory 106 and memory 120 may store data representing a point cloud. Computer-readable medium 110 may represent any type of medium or device capable of transporting the encoded data from source device 102 to destination device 116. In one example, computer-readable medium 110 represents a communication medium to enable source device 102 to transmit encoded data directly to destination device 116 in real-time, e.g., via a radio frequency network or computer-based network. Output interface 108 may modulate a transmission signal including the encoded data, and input interface 122 may demodulate the received transmission signal, according to a communication standard, such as a wireless communication protocol. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 102 to destination device 116.

In some examples, source device 102 may output encoded data from output interface 108 to storage device 112. Similarly, destination device 116 may access encoded data from storage device 112 via input interface 122. Storage device 112 may include any of a variety of distributed or locally accessed data storage media such as a hard drive, Blu-ray discs, DVDs, CD-ROMs, flash memory, volatile or non-volatile memory, or any other suitable digital storage media for storing encoded data.

In some examples, source device 102 may output encoded data to file server 114 or another intermediate storage device that may store the encoded data generated by source device 102. Destination device 116 may access stored data from file server 114 via streaming or download. File server 114 may be any type of server device capable of storing encoded data and transmitting that encoded data to the destination device 116. File server 114 may represent a web server (e.g., for a website), a File Transfer Protocol (FTP) server, a content delivery network device, or a network attached storage (NAS) device. Destination device 116 may access encoded data from file server 114 through any standard data connection, including an Internet connection. This may include a wireless channel (e.g., a Wi-Fi connection), a wired connection (e.g., digital subscriber line (DSL), cable modem, etc.), or a combination of both that is suitable for accessing encoded data stored on file server 114. File server 114 and input interface 122 may be configured to operate according to a streaming transmission protocol, a download transmission protocol, or a combination thereof.

Output interface 108 and input interface 122 may represent wireless transmitters/receivers, modems, wired networking components (e.g., Ethernet cards), wireless communication components that operate according to any of a variety of IEEE 802.11 standards, or other physical components. In examples where output interface 108 and input interface 122 comprise wireless components, output interface 108 and input interface 122 may be configured to transfer data, such as encoded data, according to a cellular communication standard, such as 4G, 4G-LTE (Long-Term Evolution), LTE Advanced, 5G, or the like. In some examples where output interface 108 comprises a wireless transmitter, output interface 108 and input interface 122 may be configured to transfer data, such as encoded data, according to other wireless standards, such as an IEEE 802.11 specification, an IEEE 802.15 specification (e.g., ZigBee™), a Bluetooth™ standard, or the like. In some examples, source device 102 and/or destination device 116 may include respective system-on-a-chip (SoC) devices. For example, source device 102 may include an SoC device to perform the functionality attributed to G-PCC encoder 200 and/or output interface 108, and destination device 116 may include an SoC device to perform the functionality attributed to G-PCC decoder 300 and/or input interface 122.

The techniques of this disclosure may be applied to encoding and decoding in support of any of a variety of applications, such as communication between autonomous vehicles, communication between scanners, cameras, sensors and processing devices such as local or remote servers, geographic mapping, or other applications.

Input interface 122 of destination device 116 receives an encoded bitstream from computer-readable medium 110 (e.g., a communication medium, storage device 112, file server 114, or the like). The encoded bitstream may include signaling information defined by G-PCC encoder 200, which is also used by G-PCC decoder 300, such as syntax elements having values that describe characteristics and/or processing of coded units (e.g., slices, pictures, groups of pictures, sequences, or the like). Data consumer 118 uses the decoded data. For example, data consumer 118 may use the decoded data to determine the locations of physical objects. In some examples, data consumer 118 may comprise a display to present imagery based on a point cloud.

G-PCC encoder 200 and G-PCC decoder 300 each may be implemented as any of a variety of suitable encoder and/or decoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of G-PCC encoder 200 and G-PCC decoder 300 may be included in one or more encoders or decoders, either of which may be integrated as part of a combined encoder/decoder (CODEC) in a respective device. A device including G-PCC encoder 200 and/or G-PCC decoder 300 may comprise one or more integrated circuits, microprocessors, and/or other types of devices.

G-PCC encoder 200 and G-PCC decoder 300 may operate according to a coding standard, such as video point cloud compression (V-PCC) standard or a geometry point cloud compression (G-PCC) standard. This disclosure may generally refer to coding (e.g., encoding and decoding) of pictures to include the process of encoding or decoding data. An encoded bitstream generally includes a series of values for syntax elements representative of coding decisions (e.g., coding modes).

This disclosure may generally refer to "signaling" certain information, such as syntax elements. The term "signaling" may generally refer to the communication of values for syntax elements and/or other data used to decode encoded data. That is, G-PCC encoder 200 may signal values for syntax elements in the bitstream. In general, signaling refers to generating a value in the bitstream. As noted above, source device 102 may transport the bitstream to destination device 116 substantially in real time, or not in real time, such as might occur when storing syntax elements to storage device 112 for later retrieval by destination device 116.

ISO/IEC MPEG (JTC 1/SC 29/WG 11) is studying the potential need for standardization of point cloud coding technology with a compression capability that significantly exceeds that of the current approaches and will target to create the standard. The group is working together on this exploration activity in a collaborative effort known as the 3-Dimensional Graphics Team (3DG) to evaluate compression technology designs proposed by their experts in this area.

Point cloud compression activities are categorized in two different approaches. The first approach is "Video point cloud compression" (V-PCC), which segments the 3D object, and project the segments in multiple 2D planes (which are represented as "patches" in the 2D frame), which are further coded by a legacy 2D video codec such as a High Efficiency Video Coding (HEVC) (ITU-T H.265) codec. The second approach is "Geometry-based point cloud compression" (G-PCC), which directly compresses 3D geometry i.e., position of a set of points in 3D space, and associated attribute values (for each point associated with the 3D geometry). G-PCC addresses the compression of point clouds in both Category 1 (static point clouds) and Category 3 (dynamically acquired point clouds). A recent draft of the G-PCC standard is available in G-PCC DIS, ISO/IEC JTC1/SC29/WG11 w19088, Brussels, Belgium, January 2020, and a description of the codec is available in G-PCC Codec Description v6, ISO/IEC JTC1/SC29/WG11 w19091, Brussels, Belgium, January 2020.

A point cloud contains a set of points in a 3D space, and may have attributes associated with the point. The attributes may be color information such as R, G, B or Y, Cb, Cr, or reflectance information, or other attributes. Point clouds may be captured by a variety of cameras or sensors such as LIDAR sensors and 3D scanners and may also be computer-generated. Point cloud data are used in a variety of applications including, but not limited to, construction (modeling), graphics (3D models for visualizing and animation), and the automotive industry (LIDAR sensors used to help in navigation).

The 3D space occupied by a point cloud data may be enclosed by a virtual bounding box. The position of the points in the bounding box may be represented by a certain precision; therefore, the positions of one or more points may be quantized based on the precision. At the smallest level, the bounding box is split into voxels which are the smallest unit of space represented by a unit cube. A voxel in the bounding box may be associated with zero, one, or more than one point. The bounding box may be split into multiple cube/cuboid regions, which may be called tiles. Each tile may be coded into one or more slices. The partitioning of the bounding box into slices and tiles may be based on number of points in each partition, or based on other considerations (e.g., a particular region may be coded as tiles). The slice regions may be further partitioned using splitting decisions similar to those in video codecs.

Figure 2:
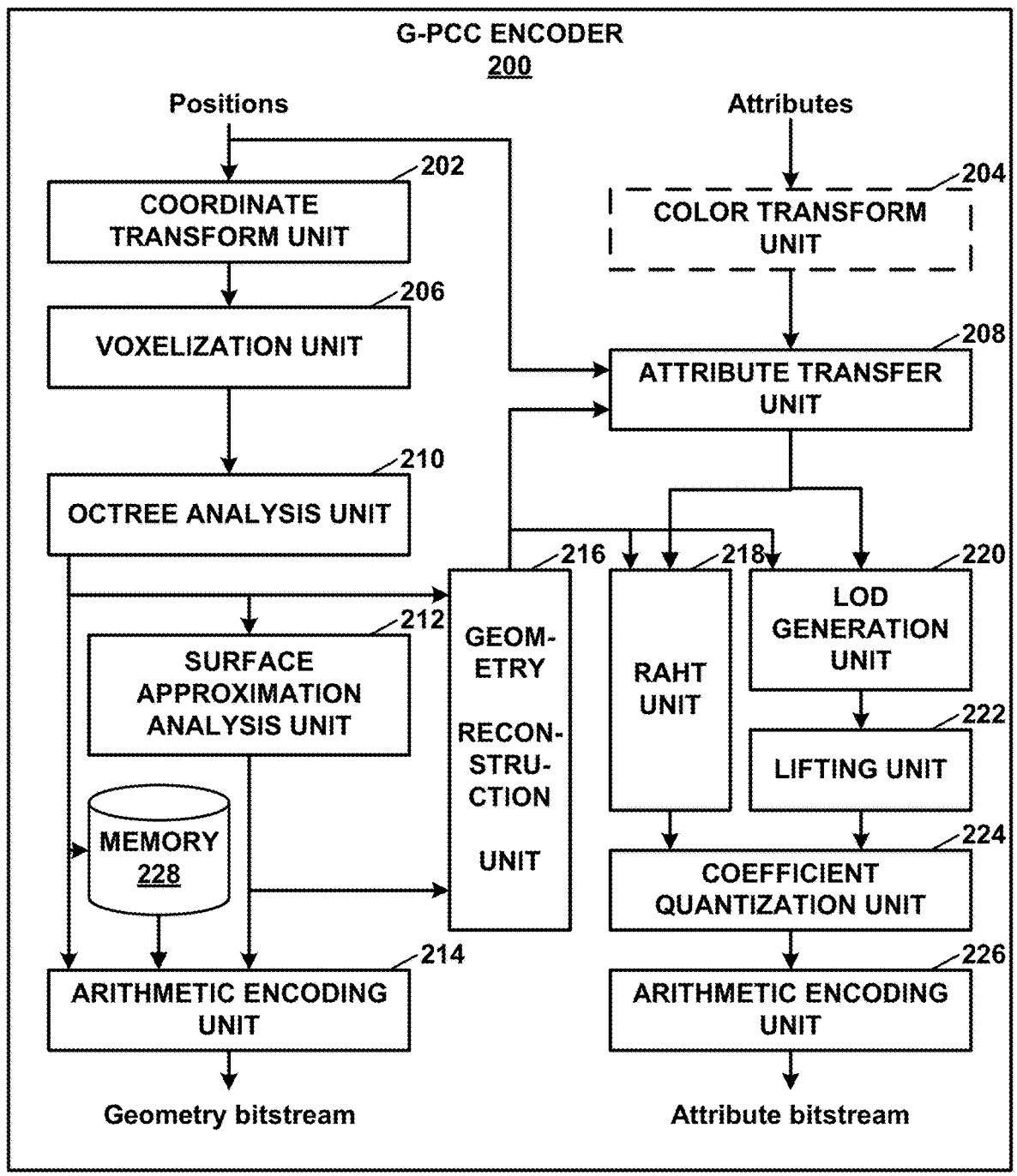
FIG. 2 is a block diagram illustrating an example Geometry Point Cloud Compression (G-PCC) encoder, in accordance with one or more techniques of this disclosure.
Figure 3:
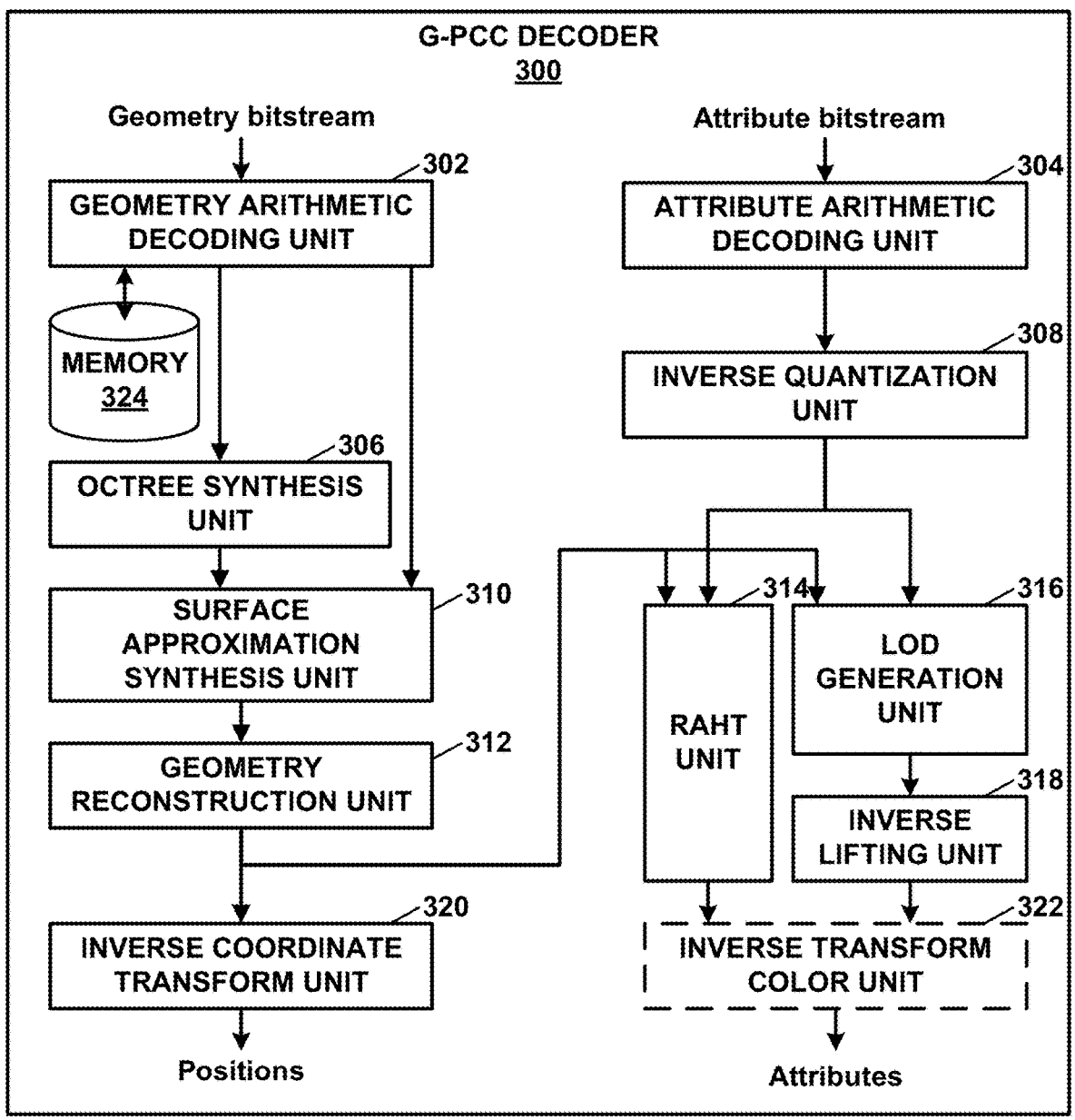
FIG. 3 is a block diagram illustrating an example G-PCC decoder, in accordance with one or more techniques of this disclosure.

FIG. 2 provides an overview of G-PCC encoder 200. FIG. 3 provides an overview of G-PCC decoder 300. The modules shown are logical, and do not necessarily correspond one-to-one to implemented code in the reference implementation of G-PCC codec, i.e., TMC13 test model software studied by ISO/IEC MPEG (JTC 1/SC 29/WG 11). In both G-PCC encoder 200 and G-PCC decoder 300, point cloud positions are coded first. Attribute coding depends on the decoded geometry.

For Category 3 data, the compressed geometry is typically represented as an octree from the root all the way down to a leaf level of individual voxels. For Category 1 data, the compressed geometry is typically represented by a pruned octree (i.e., an octree from the root down to a leaf level of blocks larger than voxels) plus a model that approximates the surface within each leaf of the pruned octree. In this way, both Category 1 and 3 data share the octree coding mechanism, while Category 1 data may in addition approximate the voxels within each leaf with a surface model. The surface model used is a triangulation comprising 1-10 triangles per block, resulting in a triangle soup. The Category 1 geometry codec is therefore known as the Trisoup geometry codec, while the Category 3 geometry codec is known as the Octree geometry codec.

At each node of an octree, an occupancy is signaled (when not inferred) for one or more of its child nodes (up to eight nodes). Multiple neighborhoods are specified including (a) nodes that share a face with a current octree node, (b) nodes that share a face, edge or a vertex with the current octree node, etc. Within each neighborhood, the occupancy of a node and/or its children may be used to predict the occupancy of the current node or its children. For points that are sparsely populated in certain nodes of the octree, the codec also supports a direct coding mode where the 3D position of the point is encoded directly. A flag may be signaled to indicate that a direct mode is signaled. At the lowest level, the number of points associated with the octree node/leaf node may also be coded.

Once the geometry is coded, the attributes corresponding to the geometry points are coded. When there are multiple attribute points corresponding to one reconstructed/decoded geometry point, an attribute value may be derived that is representative of the reconstructed point.

There are three attribute coding methods in G-PCC: Region Adaptive Hierarchical Transform (RAHT) coding, interpolation-based hierarchical nearest-neighbour prediction (Predicting Transform), and interpolation-based hierarchical nearest-neighbour prediction with an update/lifting step (Lifting Transform). RAHT and Lifting are typically used for Category 1 data, while Predicting is typically used for Category 3 data. However, either method may be used for any data, and, just like with the geometry codecs in G-PCC, the attribute coding method used to code the point cloud is specified in the bitstream.

The coding of the attributes may be conducted in a level-of-detail (LOD), where with each level of detail a finer representation of the point cloud attribute may be obtained. Each level of detail may be specified based on distance metric from the neighboring nodes or based on a sampling distance.

At G-PCC encoder 200, the residuals obtained as the output of the coding methods for the attributes are quantized. The residuals may be obtained by subtracting the attribute value from a prediction that is derived based on the points in the neighborhood of the current point and based on the attribute values of points encoded previously. The quantized residuals may be coded using context adaptive arithmetic coding.

G-PCC also includes an angular coding model. Angular coding mode may enhance coding efficiency of planar mode using, e.g., sensor characteristics of a typical LIDAR sensor. The angular coding mode may optionally be used together with the planar mode and may improve the coding of the vertical (z) plane position syntax element by employing data regarding positions and angles of sensing laser beams in a typical LIDAR sensor. Furthermore, the angular coding mode can optionally be used to improve the coding of vertical z-position bits in inferred direct coding mode (IDCM). The angular coding mode may use a simplified context derivation and efficient high level signaling (HLS) coding of sensor data parameters.

The azimuthal coding mode is similar to the angular mode and extends the angular mode to the coding of the (x) and (y) plane position syntax elements of the planar mode and improves the coding of the x- or y-position bits in IDCM. The azimuthal coding mode may use a reduced number of contexts.

The specification related to planar coding mode is summarized below:

8.2.3.1 Eligibility of a Node for Planar Coding Mode

Split and Relocate

Explicit coding of occupancy planes is conditioned on probability.

The array PlanarRate, with elements PlanarRate[k], for k=0 . . . 2, is an estimate of the probability that the occupancy of a node forms a single plane perpendicular to the k-th axis.

The variable LocalDensity is an estimate of the mean number of occupied children in a node.

The variable NumNodesUntilPlanarUpdate counts the number of nodes to be parsed before updating PlanarRate and LocalDensity.

At the start of parsing a geometry_octree syntax structure, PlanarRate and LocalDensity are initialised as follows:

for ($k=0;k<3;k++$)

PlanarRate[$k$]=1024

LocalDensity=4096

NumNodesUntilPlanarUpdate=0

At the start of parsing each geometry_octree_node syntax structure, NumNodesUntilPlanarUpdate is decremented. If NumNodesUntilPlanarUpdate is less than zero, PlanarRate and LocalDensity are updated as follows:

The number of occupied sibling nodes is determined and used to update the LocalDensity estimate:

let numSiblings=NodeNumChildren[depth−1]
   [s$Np$][t$Np$][v$Np$]

LocalDensity=(255×LocalDensity+1024×numSiblings)>>>8

The number of nodes until the next update is:

NumNodesUntilPlanarUpdate=numSiblings−1

The parent node's occupancy information is used to determine, along each axis, the presence of a single occupied plane and to update the corresponding planar probability estimate PlanarRate[k].

```
let parentOccupancy = GeometryNodeOccupancy[depth −
  1][sNp][tNp][vNp]
let planeMasks0 = { 0xf0, 0xcc, 0xaa }
let planeMasks1 = { 0x0f, 0x33, 0x55 }
for (k = 0; k < 3; k++) {
  let plane0 = (parentOccupancy & planeMaks0[k]) != 0
  let plane1 = (parentOccupancy & planeMaks1[k]) != 0
  let hasSinglePlane = plane0 ^ plane1
  PlanarRate[k] = (255 × PlanarRate[k] + 8 × 256 ×
    hasSinglePlane + 128) >> 8
}
```

At the start of parsing each geometry_octree_node syntax structure, it is determined for each axis if the current node is eligible to signal plane information. The output of this process is the array PlanarEligible, with elements PlanarEligible[k], for k=0 . . . 2.

First, PlanarRate is used to determine the order, planeOrder[k], of the three planes from most to least likely according to Table 18 below.

Then, PlanarEligible is set as follows:

```
for (k = 0; k < 3; k++) {
  if (EffectiveNodeSizeLog2[k] <= 0)
    PlanarEligible[k] = 0
  else if (!geom_tree_coded_axis_flag[depth][k])
    PlanarEligible[k] = 0
  else if (!geometry_planar_enabled_flag)
    PlanarEligible[k] = 0
  else if (angular mode linkage)
    PlanarEligible[k] = X
  else if (LocalDensity >= 3 × 1024)
    PlanarEligible[k] = 0
  else
    PlanarEligible[k] = PlanarRate[k] > geom_planar_th[planeOrder[k]]
}
```

TABLE 18

Determination of the values of planeOrder[k] from planarRate[k]

| Condition | planeOrder[0] | planeOrder[1] | planeOrder[2] |
|---|---|---|---|
| PlanarRate[0] ≥ PlanarRate[1] ≥ PlanarRate[2] | 0 | 1 | 2 |
| PlanarRate[0] ≥ PlanarRate[2] > PlanarRate[1] | 0 | 2 | 1 |
| PlanarRate[1] > PlanarRate[0] ≥ PlanarRate[2] | 1 | 0 | 2 |
| PlanarRate[1] ≥ PlanarRate[2] > PlanarRate[0] | 1 | 2 | 0 |
| PlanarRate[2] > PlanarRate[0] ≥ PlanarRate[1] | 2 | 0 | 1 |
| PlanarRate[2] > PlanarRate[1] > PlanarRate[0] | 2 | 1 | 0 |

G-PCC encoder 200 and G-PCC decoder 300 may code a value for a syntax element indicating whether a node is planar, such as an is_planar_flag syntax element, according to the following semantics: is_planar_flag[axisIdx] equal to 1 indicates that the positions of the current node's children form a single plane perpendicular to the axisIdx-th axis. is_planar_flag[axisIdx] equal to 0, when present, indicates that the positions of the current node's children occupy both planes perpendicular to the axisIdx-th axis. G-PCC encoder 200 and G-PCC decoder 300 may code the is_planar_flag using a context index set equal to axisIdx as indicated in G-PCC DIS, ISO/IEC JTC1/SC29/WG11 w55637, Teleconference, November 2020.

The G-PCC standard specification regarding tracking nodes along an axis is reproduced below:

8.2.3.2 Buffer Tracking the Closest Nodes Along an Axis

The arrays PlanarPrevPos, PlanarPlane, IsPlanarNode record information about previously decoded geometry tree nodes for use in the determination of ctxIdx for the syntax element plane_position. When either geometry_planar_enabled_flag is equal to 0 or planar_buffer_disabled_flag is equal to 1, the arrays are not used by the decoding process.

In this process, the variable axisIdx is used to represent one of the three coded axes, the variable axisPos represents the position of a node along the axisIdx-th axis. Values of axisPos are in the range 0 . . . 0x3fff.

The array IsPlanarNode, with values IsPlanarNode[axisIdx][axisPos] indicates whether the most recently decoded node with an axisIdx-th position component equal to axisPos is planar in the plane perpendicular to the axisIdx-th axis.

The array PlanarPrevPos, with values PlanarPrevPos[axisIdx][axisPos] storing the maximum position component of the most recently decoded node with an axisIdx-th position component equal to axisPos.

The array PlanarPlane, with values PlanarPlane[axisIdx][axisPos] indicates the value of plane_position[axisIdx] for the most recently decoded node with an axisIdx-th position component equal to axisPos.

At the start of each geometry tree level, each element of the arrays PlanarPrevPos and IsPlanarNode is initialized to 0.

After decoding each geometry_planar_mode_data syntax structure with parameters childIdx and axisIdx, the arrays PlanarPrevPos, PlanarPlane and IsPlanarNode are updated as follows:

The variable axisPos representing a position along the axisIdx-th axis is derived as follows:

if (axisIdx==0)axisPos=$sN$&0x3fff if (axisIdx==1)axisPos=$tN$&0x3fff if (axisIdx==2)axisPos=$vN$&0x3fff The array entries corresponding to the node are updated as follows:

if (axisIdx==0)maxPos=Max($tN$&0x7c0,$vN$&0x7c0)>>3 if (axisIdx==1)maxPos=Max($sN$&0x7c0,$vN$&0x7c0)>>3 if (axisIdx==2)maxPos=Max($sN$&0x7c0,$tN$&0x7c0)>>3

PlanarPrevPos[axisIdx][axisPos]=maxPos if (is_planar_flag[axisPos])

PlanarPlane[axisIdx][axisPos]=plane_position[axisIdx]

IsPlanarNode[axisIdx][axisPos]=is_planar_flag[axisIdx]

8.2.3.3 Determination of ctxIdx for the Syntax Element Plane_Position

The inputs to this process are:
the variable axisIdx identifying the axis normal to a plane, and the position (sN, tN, vN) of the current node within a geometry tree level.

The output of this process is the variable ctxIdx.

The variable neighOccupied indicates whether there is a node that both neighbours the current node along the axisIdx-th axis. It is derived as follows:

neighOccupied=(NeighbourPattern>>2×axisIdx)&3 adjPlaneCtxInc=neighOccupied==3?0:neighOccupied if (axisIdx==0&& neighOccupied==3)

adjPlaneCtxInc=((neighOccupied &1)<<1)|(neighOccupied>>1)

When planar_buffer_disabled_flag is equal to 1, the value of ctxIdx is set equal to adjPlaneCtxInc and no further processing is performed by this process. Otherwise, the remainder of this clause applies.

The variable axisPos indicates the 14 least significant position bits of the current node along the axisIdx-th axis:

if (axisIdx==0)axisPos=$sN$&0x3fff if (axisIdx==1)axisPos=$tN$&0x3fff if (axisIdx==2)axisPos=$vN$&0x3fff The variable dist represents a distance between the current node and the most recently decoded node position with the same value of axisPos along the axisIdx-th axis. It is derived as follows:

$a$=PlanarPrevPos[axisIdx][axisPos]

if (axisIdx==0)$b$=Max($tN$&0x7c0,$vN$&0x7c0)>>3 if (axisIdx==1)$b$=Max($sN$&0x7c0,$vN$&0x7c0)>>3 if (axisIdx==2)$b$=Max($sN$&0x7c0,$tN$&0x7c0)>>3 dist=Abs($a$−$b$)

The context index ctxIdx is derived as follows:

```
if (!IsPlanarNode[axisIdx][axisPos])
  ctxIdx = adjPlaneCtxInc
else {
  prevPlane = PlanarPlane[axisIdx][axisPos]
  distCtxInc = (dist > 1)
  ctxIdx = 12 × axisIdx + 4 × adjPlaneCtxInc + 2 × distCtxInc +
  prevPlane + 3
}
```

8.2.3.4 Determination of planePosIdxAzimuthalS and planePosIdxAzimuthalT for the Coding of the Horizontal Plane Positions The determination of planePosIdxAngularS for the arithmetic coding of plane_position[0] and of planePosIdxAngularT for the arithmetic coding of plane_position[1] is obtained as follows.

When geometry_angular_enabled_flag is equal to 0, the values of both planePosIdxAzimuthalS and planePosIdxAzimuthalT are set equal to planePosIdx. Otherwise, the following applies:

```
if (contextAzimuthalS == −1)
  planePosIdxAzimuthalS = planePosIdx
else
  planePosIdxAzimuthalS = 39 + contextAzimuthalS
if (contextAzimuthalT == −1)
  planePosIdxAzimuthalT = planePosIdx
else
  planePosIdxAzimuthalT = 39 + contextAzimuthalT
```

The determination of contextAngular for the arithmetic coding of plane_position[2] is performed as described in XREF.

8.2.3.5 Determination of planePosIdxAngular for the Coding of the Vertical Plane Position The determination of planePosIdxAngular for the arithmetic coding of plane_position[2] is obtained as follows.

When geometry_angular_enabled_flag is equal to 0, the value of planePosIdxAngular is set equal to planePosIdx. Otherwise, the following applies:

```
if (contextAngular == −1)
    planePosIdxAngular = planePosIdx
else
    planePosIdxAngular = 47 + contextAngular
```

The determination of contextAngular for the arithmetic coding of plane_position[2] is performed as described in section 8.2.5.3.

Angular mode syntax for G-PCC is summarised below:

Certain syntax elements that carry the LIDAR laser sensor information that may provide coding efficiency benefits for the angular coding mode are discussed below. Semantics of certain syntax elements are specified as follows:

geometry_planar_enabled_flag equal to 1 indicates that the planar coding mode is activated. geometry_planar_enabled_flag equal to 0 indicates that the planar coding mode is not activated. When not present, geometry_planar_enabled_flag is inferred to be 0.

geom_planar_th[i], for i in the range 0 . . . 2, specifies the value of the threshold of activation for planar coding mode along the i-th most probable direction for the planar coding mode to be efficient.

geom_idcm_rate_minus1 specifies the rate at which nodes may be eligible for direct coding. When not present, geom_idcm_rate_minus1 is inferred to be 31. The array IdcmEnableMask is derived as follows:

```
for (i = 0, acc = 0; i < 32; i++) {
    acc += geom_idcm_rate_minus1 + 1
    IdcmEnableMask[i] = acc >= 32
    acc &= 0x1f
}
``` geometry_angular_enabled_flag equal to 1 indicates that the angular coding mode is activated. geometry_angular_enabled_flag equal to 0 indicates that the angular coding mode is not activated.

geom_slice_angular_origin_present_flag equal to 1 specifies that a slice relative angular origin is present in the geometry data unit. geom_slice_angular_origin_present_flag equal to 0 specifies that an angular origin is not present in the geometry data unit. When not present, geom_slice_angular_origin_present_flag is inferred to be 0.

geom_angular_origin_bits_minus1 plus 1 is the length in bits of the syntax elements geom_angular_origin_xyz[k].

geom_angular_origin_xyz[k] specifies the k-th component of the (x, y, z) co-ordinate of the origin used in the processing of the angular coding mode. When not present, the value of geom_angular_origin_xyz[k] with k=0 . . . 2 is inferred to be 0.

geom_angular_azimuth_scale_log 2__minus11 and geom_angular_radius_scale_log 2 specify factors used to scale positions coded using a spherical co-ordinate system during conversion to cartesian co-ordinates.

geom_angular_azimuth_step_minus1 plus 1 specifies a unit change in azimuth angle. Differential prediction residuals used in angular predictive tree coding may be partially represented as multiples of geom_angular_azimuth_step_minus1 plus 1. The value of geom_angular_azimuth_step_minus1 shall be less than (1<<(geom_angular_azimuth_scale_log 2_minus11+ 12)).

number_lasers_minus1 plus 1 specifies the number of lasers used for the angular coding mode.

laser_angle_init and laser_angle_diff[i] with i=0 . . . number_lasers_minus1 specify the tangent of the elevation angle of the i-th laser relative to the horizontal plane defined by the first and second coded axes.

The array LaserAngle[i] with i=0 . . . number_lasers_minus1 is derived as follows:

LaserAngle[0]=laser_angle_init if (number_lasers_minus1>0)

LaserAngle[1]=laser_angle_init+laser_angle_diff[1]

for (i=2;i<=number_lasers_minus1;i++)

LaserAngle[i]=2×LaserAngle[i−1]−LaserAngle[i−2]+ laser_angle_diff[i]

It is a requirement of bitstream conformance that the value of LaserAngle[i] with i=1 . . . number_lasers_minus1 shall be greater than or equal to LaserAngle[i−1].

laser_correction_init and laser_correction_diff[i] with i=1 . . . number_lasers_minus1 specify the correction, along the second internal axis, of the i-th laser position relative to the GeomAngularOrigin[2].

laser_phi_per_turn_init_minus1 and laser_phi_per_turn_diff[i] with i=1 . . . number_lasers_minus1 specify the number of samples produced by the i-th laser of a rotating sensing system located at the origin used in the processing of the angular coding mode.

The arrays LaserCorrection[i] and LaserPhiPerTurn[i] with i=1 . . . number_lasers_minus1 are derived as follows:

```
LaserCorrection[0] = laser_correction_init
LaserPhiPerTurn[0] = laser_phi_per_turn_init_minus1 + 1
for (i = 1; i <= number_lasers_minus1; i++) {
    LaserCorrection[i] = LaserCorrection[i-1] + laser_correction_diff[i]
    LaserPhiPerTurn[i] = LaserPhiPerTurn[i-1] + laser_phi_per_turn_diff[i]
}
```

It is a requirement of bitstream conformance that the value of LaserPhiPerTurn[i] with i=0 . . . number_lasers_minus1 shall not be 0.

The arrays DeltaPhi[i] and InvDeltaPhi[i] with i=0 . . . number_lasers_minus1 are derived as follows:

```
for (i = 0; i <= number_lasers_minus1; i++) {
    DeltaPhi[i] = 6588397 / LaserPhiPerTurn[i]
    InvDeltaPhi[i] = (LaserPhiPerTurn[i] << 30) / 6588397
}
``` planar_buffer_disabled_flag equal to 1 indicates that tracking the closest nodes using a buffer is not used in process of coding the planar mode flag and the plane position in the planar mode. planar_buffer_disabled_flag equal to 0 indicates that tracking the closest nodes using a buffer is used. When not present, planar_buffer_disabled_flag is inferred to be !geometry_planar_enabled_flag.

TABLE 2

Geometry parameter set syntax. Angular mode syntax elements are highlighted using <++ and ++> tags.

| | Descriptor |
|---|---|
| geometry_parameter_set( ) { | |
|   gps_geom_parameter_set_id | u(4) |
|   gps_seq_parameter_set_id | u(4) |
|   gps_gsh_box_log2_scale_present_flag | u(1) |
|   if( !gps_gsh_box_log2_scale_present_flag) | |
|     gps_gs_box_log2_scale | ue(v) |
|   duplicate_points_enabled_flag | u(1) |
|   geom_tree_type | u(1) |
|   if( geom_tree_type == 0 ) { | |
|     geom_num_points_list_present_flag | u(1) |
|     inferred_direct_coding_mode | u(2) |
|     if( inferred_direct_coding_mode ) | |
|       joint_2point_idcm_enabled_flag | u(1) |
|     geom_tree_coded_axis_list_present_flag | u(1) |
|     log2_neighbour_avail_boundary_minus1 | u(3) |
|     if( log2_neighbour_avail_boundary_minus1 > 0 ) { | |
|       adjacent_child_contextualization_enabled_flag | u(1) |
|       log2_intra_pred_max_node_size | ue(v) |
|     } | |
|     bitwise_occupancy_coding_flag | u(1) |
|     geometry_planar_enabled_flag | u(1) |
|     if( geometry_planar_enabled_flag ){ | |
|       for( i = 0; i < 3; i++) | |
|         geom_planar_th[ i ] | ue(v) |
|       if( inferred_direct_coding_mode == 1 ) | |
|         geom_idcm_rate_minus1 | u(5) |
|     } | |
|   } | |
|   <++geometry_angular_enabled_flag++> | u(1) |
|   <++if( geometry_angular_enabled_flag ){++> | |
|     <++geom_slice_angular_origin_present_flag++> | u(1) |
|     <++if( !geom_slice_angular_origin_present_flag ) {++> | |
|       <++geom_angular_origin_bits_minus1++> | ue(v) |
|       <++for( k = 0; k < 3; k++ )++> | |
|         <++geom_angular_origin_xyz[ k ]++> | s(v) |
|     <++}++> | |
|     <++if( geom_tree_type == 1 ) {++> | |
|       <++geom_angular_azimuth_scale_log2_minus11++> | ue(v) |
|       <++geom_angular_azimuth_step_minus1++> | ue(v) |
|       <++geom_angular_radius_scale_log2++> | ue(v) |
|     <++}++> | |
|     <++number_lasers_minus1++> | ue(v) |
|     <++laser_angle_init++> | se(v) |
|     <++laser_correction_init++> | se(v) |
|     <++if( geom_tree_type == 0 )++> | |
|       <++laser_phi_per_turn_init_minus1++> | ue(v) |
|     <++for( i = 1; i <= number_lasers_minus1; i++ ) {++> | |
|       <++laser_angle_diff[ i ]++> | se(v) |
|       <++laser_correction_diff[ i ]++> | se(v) |
|       <++if( geom_tree_type == 0 )++> | |
|         <++laser_phi_per_turn_diff[ i ]++> | se(v) |
|     } | |
|     if( geometry_planar_enabled_flag ) | |
|       planar_buffer_disabled_flag | u(1) |
|   } | |
|   geom_scaling_enabled_flag | u(1) |
|   if( geom_scaling_enabled_flag ) { | |
|     geom_base_qp | ue(v) |
|     geom_qp_multiplier_log2 | u(2) |
|     if( geom_tree_type == 1 ) | |
|       geom_qp_offset_intvl_log2 | ue(v) |
|     else if( inferred_direct_coding_mode ) | |
|       geom_direct_coding_mode_qp_offset | se(v) |
|   } | |
|   gps_extension_flag | u(1) |
|   if( gps_extension_flag ) | |
|     while( more_data_in_data_unit( ) ) | |
|       gps_extension_data_flag | u(1) |
|   byte_alignment( ) | |
| } | |

The data syntax of the planar mode and direct mode is included in Table 3 and Table 4, respectively.

TABLE 3

Geometry octree mode data syntax

| | Descriptor |
|---|---|
| geometry_node( depth, nodeIdx, sN, tN, vN ) { | |
|   if( geom_node_qp_offset_present_flag ) { | |
|     geom_node_qp_offset_abs_gt0_flag | ae(v) |
|     if( geom_node_qp_offset_abs_gt0_flag ) { | |
|       geom_node_qp_offset_abs_minus1 | ae(v) |
|       geom_node_qp_offset_sign_flag | ae(v) |
|     } | |
|   } | |
|   if( geometry_planar_enabled_flag ) | |
|     for( k = 0; k < 3; k++ ) | |
|       if( PlanarEligible[ k ] ) { | |
|         *is_planar_flag [ k ]* | ae(v) |
|         if( is_planar_flag[ k ] ) | |
|           *place_position [ k ]* | ae(v) |
|       } | |
|   if( DirectModeFlagPresent ) | |
|     direct_mode_flag | ae(v) |
|   if( direct_mode_flag ) | |
|     geometry_direct_mode_data( ) | |
|   else { | |
|     if( OccupancyIdxMaybePresent ) | |
|       single_child_flag | ae(v) |
|     if( single_child_flag ) | |
|       for( k = 0; k < 3; k++ ) | |
|         if( ! isPlanar[ k ] ) | |
|           occupancy_idx[ k ] | ae(v) |
|     if( OccupancyMapPresent ) | |
|       if( bitwise_occupancy_flag ) | |
|         occupancy_map | ae(v) |
|       else | |
|         occupancy_byte | de(v) |
|     if( LeafNode && duplicate_points_enabled_flag ) | |
|       for( child = 0; child < NumChildren; child++ ) { | |
|         dup_point_cnt_gt0_flag[ child ] | ae(v) |
|         if( dup_point_cnt_gt0_flag[ child ] ) | |
|           dup_point_cnt_minus1[ child ] | ae(v) |
|       } | |
|   } | |
| } | |

TABLE 4

Direct mode data syntax

| | Descriptor |
|---|---|
| geometry_direct_mode_data( ) { | |
|   direct_point_cnt_eq2_flag | ae(v) |
|   if( duplicate_points_enabled_flag | |
|   && !direct_point_cnt_eq2_flag ) { | |
|     dup_point_cnt_gt0_flag | ae(v) |
|     if( dup_point_cnt_gt0_flag ) { | |
|       dup_point_cnt_gt1_flag | ae(v) |
|       if( dup_point_cnt_gt1_flag ) | |
|         dup_point_cnt_minus2 | ae(v) |
|     } | |
|   } | |
|   if( joint_2point_idcm_enabled_flag && | |
|   direct_point_cnt_eq2_flag ) | |
|     geometry_direct_mode_joint_2points( ) | |
|   for( i = 0; i <= direct_point_cnt_eq2_flag; i++ ) { | |
|     if( geometry_angular_enabled_flag ) | |
|       geometry_direct_mode_angular( i ) | |
|     else | |
|       for( k = 0; k < 3; k++ ) | |
|         geometry_direct_mode_offset( i, k ) | |
|   } | |
| } | |

8.2.4.1 Derivation Process of the Angular Eligibility for a Node

If geometry_angular_enabled_flag is equal to 0, angular_eligible is set to equal to 0.

Otherwise, the following applies:

The variable deltaAngle specifying the minimum angular distance between the lasers is derived as follows:

```
deltaAngle = 128 << 18
for(i=0; i<number_lasers_minus1; i++){
    delta = LaserAngle[i + 1] − LaserAngle[i]
    if ( deltaAngle > delta )
        deltaAngle = delta
}
```

Finally, angular_eligible is derived as follows:

```
midNodeS = 1 << (Max(1, ChildNodeSizeLog2[0]) − 1)
midNodeT = 1 << (Max(1, ChildNodeSizeLog2[1]) − 1)
sLidar = Abs(((sNchild − GeomAngularOrigin[0] + midNodeS) << 8) − 128)
tLidar = Abs(((tNchild − GeomAngularOrigin[1] + midNodeT) << 8) − 128)
rL1 = (sLidar + tLidar) >> 1
deltaAngleR = deltaAngle × rL1
midNodeV = 1 << (Max(1, ChildNodeSizeLog2[2]) − 1)
if ( number_lasers_minus1 > 0 && deltaAngleR <= (midNodeV << 26))
    angular_eligible = 0
else
    angular_eligible = 1
```

8.2.4.2 Derivation Process of Laser Index laserIndex Associated with a Node

If the angular eligibility angular_eligible is equal to 0, then laserIndex index is set to a preset value UNKOWN_LASER.

Otherwise, if the angular eligibility angular_eligible is equal to 1, the following applies as a continuation of the process described in 8.2.5.1.

Firstly, the inverse rInv of the radial distance of the current node from the Lidar is determined as follows:

$r2 = s\text{Lidar} \times s\text{Lidar} + t\text{Lidar} \times t\text{Lidar}$ $r\text{Inv} = \text{IntRecipSqrt}(r2)$ Then an angle theta32 is determined as follows:

$v\text{Lidar} = ((v N\text{child} - \text{GeomAngularOrigin}[2] + \text{midNode}T) \ll 1) - 1$ $\text{theta} = v\text{Lidar} \times r\text{Inv}$ $\text{theta32} = \text{theta} \geq 0 ? \text{theta} \gg 15 : -((-\text{theta}) \gg 15)$ Finally, the angular eligibility and the associated laser are determined as follows, based on the parent node, Parent.

```
laserIndex = UNKOWN_LASER
if (!number_lasers_minus1)
    laserIndex = 0
else if (laserIndex[Parent] == UNKOWN_LASER || deltaAngleR <= (midNodeV << (26 + 2))) {
    for (i = 1; i < number_lasers_minus1; i++)
        if (LaserAngle[i] > theta32)
            break
    if (theta32 - LaserAngle[i-1] <= LaserAngle[i] - theta32)
        i--
    laserIndex = LaserAngle[i]
}
```

8.2.4.3 Derivation Process of the Contexts contextAzimuthalS and contextAzimuthalT for Planar Coding Mode The following applies as a continuation of the process described in 8.2.5.2.

Firstly, two angles are decoded from the node position relative to the angular origin $s\text{Pos} = s N\text{child} - \text{GeomAngularOrigin}[0]$ $t\text{Pos} = t N\text{child} - \text{GeomAngularOrigin}[1]$ $\text{phiNode} = \text{Int } A \tan 2(t\text{Pos} + \text{midNode}T, s\text{Pos} + \text{midNode}S)$ $\text{phiNode0} = \text{Int } A \tan 2(t\text{Pos}, s\text{Pos})$ Secondly, an azimuthal predictor is obtained from the array phiBuffer predPhi=phiBuffer[laserIndex]
if (predPhi==0x80000000)

$\text{predPhi} = \text{phiNode}$

The two azimuthal contexts are initialized as follows $\text{contextAzimuthalS} = -1$ $\text{contextAzimuthalT} = -1$ Then, if the predictor predPhi is not equal to 0x80000000, the following applies to refine the two azimuthal contexts

```
Nshift = ((predPhi - phiNode) * InvDeltaPhi[laserIndex] + 536870912) >> 30
predPhi -= DeltaPhi[laserIndex] * Nshift
angleL = phiNode0 - predPhi
angleR = phiNode - predPhi
contextAnglePhi = (angleL >= 0 && angleR >= 0) || (angleL < 0 && angleR < 0) ? 2 : 0
angleL = Abs(angleL)
angleR = Abs(angleR)
if (angleL > angleR) {
    contextAnglePhi++
    int temp = angleL
    angleL = angleR
    angleR = temp
}
```

```
if (angleR > (angleL << 2))
   contextAnglePhi += 4
if (Abs(sPos) <= Abs(tPos))
   contextAzimuthalS = contextAnglePhi
else
   contextAzimuthalT = contextAnglePhi
```

8.2.4.4 Derivation Process of the Context contextAngular for Planar Coding Mode

If the laser index laserIndex is equal to UNKOWN_LASER, then contextAngular is set to a preset value UNKOWN_CONTEXT. Otherwise, if the laser index laserIndex is not equal to UNKOWN_LASER, the following applies as a continuation of the process described in 8.2.5.2.

Firstly, two angular differences thetaLaserDeltaBot and thetaLaserDeltaTop relative to a lower plane and an upper plane are determined.

thetaLaserDelta=LaserAngle[laserIndex]−theta32

$Hr$=LaserCorrection[laserIndex]×$r$Inv;

thetaLaserDelta+=$Hr$>=0?−($Hr$>>17):((−$Hr$)>>17)

$v$Shift=($r$Inv<<ChildNodeSize Log 2[2])>>20 thetaLaserDeltaTop=thetaLaserDelta−$v$Shift thetaLaserDeltaBot=thetaLaserDelta+$v$Shift Then, the angular context is deduced from the two angular differences.

contextAngular=thetaLaserDelta<0 if(thetaLaserDeltaTop>=0||thetaLaserDeltaBot<0)

contextAngular+=2

When in-tree quantization and angular mode are jointly enabled, a scaled version of one or more of effective node sizes, point positions, and offsets may be used in the context derivation for planar mode to ensure that the positions/offsets/node sizes and the angular origin are used at the same scale; e.g., this may be useful in the proper derivation of the laser index and in the context derivation. Not using the scaled values may result in improper derivation of the laser indices or the contexts.

G-PCC encoder 200 and G-PCC decoder 300 may be configured to code data using inferred direct coding mode (IDCM). Syntax related to IDCM mode may include the following:

inferred_direct_coding_mode greater than 0 indicates that direct_mode_flag may be present in the geometry node syntax. inferred_direct_coding_mode equal to 0 indicates that direct_mode_flag is not present in the geometry node syntax.

joint_2point_idcm_enabled_flag equal to 1 indicates that the joint coding of two points is activated in direct coding mode. joint_2point_idcm_enabled_flag equal to 0 indicates that the joint coding of two points is not activated.

geom_idcm_rate_minus1 specifies the rate at which nodes may be eligible for direct coding. When not present, geom_idcm_rate_minus1 is inferred to be 31.

The array IdcmEnableMask is derived as follows:

```
for (i = 0, acc = 0; i < 32; i++) {
   acc += geom_idcm_rate_minus1 + 1
   IdcmEnableMask[i] = acc >= 32
   acc &= 0x1f
   }
``` direct_point_cnt_eq2_flag equal to 1 specifies that the current node contains two point_offset values representing the residuals of two coded points. direct_point_cnt_eq2_flag equal to 0 specifies that the current node contains a single point_offset value representing the residuals of a single point position duplicated zero or more times.

dup_point_cnt_gt0_flag, dup_point_cnt_gt1_flag, and dup_point_cnt_minus2 together specify the number of times a single point_offset value is repeated in order to represent multiple points with the same position in the reconstructed point cloud. Any of dup_point_cnt_gt0_flag, dup_point_cnt_gt1_flag, or dup_point_cnt_minus2 that are not present are inferred to be 0.

The variable DirectDupPointCnt representing the number of times a point is repeated is derived as follows:

DirectDupPointCnt=dup_point_cnt_$gt$0_flag+dup_point_cnt_$gt$1_flag+dup_point_cnt_minus2

The array PointOffset, with elements PointOffset[i][k] for i=0 . . . NumDirectPoints−1 and k=0 . . . 2, represents the position of the k-th dimension of the i-th point relative to the current node's full resolution position. PointOffset[i][k] consists of EffectiveNodeSize Log 2[k] bits and is derived as follows.

The variable NodeSize Log 2Rem[k] indicates the number of bits that remain to be derived for PointOffset[i][k] independently on i. Initialization of NodeSize Log 2Rem and the array PointOffset is performed by, for each value of i, NodeSize Log 2 Rem[$k$]=EffectiveNodeSize Log 2[$k$]

for ($k$=0;$k$<3;$k$++)

PointOffset[$i$][$k$]=0

If is_planar_flag[k] is equal to 1, then the most significant bit of PointOffset[i][k] is derived from plane_position[k]:

```
for (k = 0; k < 3; k++)
   if (is_planar_flag[k]) {
      for (i = 0; i < NumDirectPoints; i++)
         PointOffset[i][k] = plane_position[k]
      NodeSizeLog2Rem[k]--
   }
``` same_bit[k][j] equal to 1 specifies that the respective j-th bits of PointOffset[0][k] and PointOffset[1][k] are equal. same_bit[k][j] equal to 0 specifies that these two j-th bits are not equal.

value_bit[k][j] indicates the value of the j-th bit of PointOffset[0][k]. When value_bit[k][j] is not present, its value is inferred to be 0.

The variable EligTwoPoints[k] equal to 1 indicates that the k-th component of the points contained by the node is eligible for joint coding of two points. EligTwoPoints[k] equal to 0 indicates that the k-th component of the points contained by the node is not eligible for joint coding of two points.

The variable samePrecComp[k] equal to 1 indicates that the components 0 to k−1 of the two points contained by the node are equal. Otherwise, samePrecComp[k] equal to 0 indicates that one of the components 0 to k−1 of the two points differs. samePrecComp[k] is initialized to 1.

for ($k$=0;$k$<3;$k$++)

samePrecComp[$k$]=1

If joint coding of two points is activated, if two points are present in the node and if the k-th component is eligible for joint coding, then joint two-point coding is performed for this component.

```
if (joint_2point_idcm_enabled_flag && direct_point_cnt_eq2_flag)
  for (k = 0; k < 3; k++){
    if (EligTwoPoints[k]){
      for (j = NodeSizeLog2Rem[k]-1; j>=0; j--) {
        PointOffset[0][k] << 1
        PointOffset[1][k] << 1
        PointOffset[0][k] += bit_value[k][j]
        PointOffset[1][k] += !same_bit[k][j] ^ bit_value[k][j]
        NodeSizeLog2Rem[k]--
        if (!same_bit[k][j]){
          for (k2 = k + 1; k2 < 3; k2++)
            samePrecComp[k2] = 0
          break
        }
      }
    }
  }
``` point_offset[i][k][j] is the j-th bit of the k-th component of the current node's i-th point's respective s, t, and v co-ordinates relative to the origin of the current node.

The NodeSize Log 2Rem[k] remaining bits of each point offset are set as follows:

for ($k$=0;$k$<3;$k$++)

for ($j$=NodeSizeLog 2Rem[$k$]-1;$j$>0;$j$--)

PointOffset[$i$][$k$]=(PointOffset[$i$][$k$]<<1)+point_offset[$i$][$k$][$j$]

laser_residual_abs_gt0flag[ptIdx], laser_residual_sign[ptIdx], laser_residual_abs_gt1_flag[ptIdx], laser_residual_abs_gt2_flag[ptIdx], and laser_residual_abs_minus3[ptIdx] together specify the residual laser index value associated with the ptIdx-th point of the current node that uses the inferred direct coding mode when geometry_angular_enabled_flag is equal to 1. Any of laser_residual_abs_gt0_flag[ptIdx], laser_residual_sign[ptIdx], laser_residual_abs_gt1_flag[ptIdx], laser_residual_abs_gt2_flag[ptIdx], and laser_residual_ minus3[ptIdx] that are not present are inferred to be 0.

G-PCC decoder 300 may be configured to parse and inverse binarize syntax elements related to IDCM mode as follows:

10.8 Inferred Direct Coding Mode Parsing Process
10.8.1 General Process

The parsing and inverse binarization of the syntax elements same_bit[k][j], value_bit[k][j], and point_offset[i][k][j] for a point index i, a component index k, and a bit index j is described in subclauses 9.8.2 to 9.8.5.

The output of the process is the offsets of the one, in case direct_point_cnt_eq2_flag value is 0, or two, in case direct_point_cnt_eq2_flag value is 1, points belonging to the current node. These offsets are PointOffset[0][k] for the first point and PointOffset[1][k] for the second point, when present.

Each offset PointOffset[i][k] is made of EffectiveNodeSize Log 2[k] bits that are decoded from the most significant bit to the least significant bit for each component k and each point i. For this purpose, the IDCM process makes use of the following variable the number of bits NodeSize Log 2Rem[k] that remain to be decoded for the offset of the component k, independently on the point index the partial decoding partialOffset[i][k] of k-th component of the i-th point At any step in the process, the value of the partialOffset[i][k] represents the EffectiveNodeSize Log 2[k]−NodeSize Log 2Rem[k] most significant bits of PointOffset[i][k]. During the process, partialOffset bits are determined one by one while NodeSize Log 2Rem[k] decreases, by one for each determined bit, to reach the final state where NodeSize Log 2Rem[k] is equal to 0, and partialOffset [i][k] is equal to PointOffset[i][k].

The IDCM process proceeds through subclauses 9.8.2 to 9.8.5 under the following order and conditions subclause 9.8.2 for initialization of the process variables and the inference of the most significant bit of the point offset by planar mode then, if joint coding of two points is activated (joint_2point_idcm_enabled_flag is equal to 1) and there are two points (direct_point_cnt_eq2_flag is equal to 1) in the current node, subclause 9.8.3 then, if the angular mode is activated (geometry_angular_enabled_flag is equal to 1) subclause 9.8.4, otherwise (geometry_angular_enabled_flag is equal to 0) subclause 10.8.2 Initialization and Planar Inference The number of remaining bits and partial offset are initialized by, for all component k and point i,

```
for (k = 0; k < 3; k++){
  NodeSizeLog2Rem[k] = EffectiveNodeSizeLog2[k]
  for (i = 0; i < direct_point_cnt_eq2_flag; i++)
    partialOffset[i][k] = 0
}
```

The most significant bit of the point offsets is inferred by the planar mode, if available (is_planar_flag[k] is equal to 1), as follows

```
for (k = 0; k < 3; k++)
  if (NodeSizeLog2Rem[k]>0 && is_planar_flag[k]) {
    for (i = 0; i < direct_point_cnt_eq2_flag; i++)
      partialOffset [i][k] = plane_position[k]
    NodeSizeLog2Rem[k]--
  }
```

In case angular coding mode is activated, the variable byPassSorT, indicating which of the S or T component is allowed to be bypass coded is determined using the horizontal position of the current node in the co-ordinates used in the processing of the angular coding mode

```
if (geometry_angular_enabled_flag) {
    posNode2LidarS = (sN << EffectiveNodeSizeLog2[0]) - GeomAngularOrigin[0]
    posNode2LidarT = (tN << EffectiveNodeSizeLog2[1]) - GeomAngularOrigin[1]
    byPassSorT = Abs(posNode2LidarS) <= Abs(posNode2LidarT)
}
```

10.8.3 Joint Decoding of the Offsets of Two Points

The process in this section applies only when joint_2point_idcm_enabled_flag is equal to 1 and direct_point_cnt_eq2_flag is equal to 1.

Firstly, the values of EligTwoPoints[k], that indicate if the k-th component of the two points is eligible for joint coding, are initialized by for ($k=0;k<3;k++$)

EligTwoPoints[$k$]=!geometry_angular_enabled_flag

Then, in case angular coding mode is activated, the eligibility is further determined using the variable byPassSorT

```
if (geometry_angular_enabled_flag){
    EligTwoPoints[0] = !byPassSorT
    EligTwoPoints[1] = byPassSorT
}
```

The array samePrecComp[k], indicating that the components 0 to k−1 of the two points contained by the node are equal, is initialized to for ($k=0;k<3;k++$)

samePrecComp[$k$]=1

The joint decoding process is then applied to the eligible components in increasing order

```
for (k = 0; k < 3; k++){
    if (NodeSizeLog2Rem[k]>=1 && EligTwoPoints[k]){
        idcmIdxJoint[k][NodeSizeLog2Rem[k]-1] = 0
        same_bit = 1
        for (j = NodeSizeLog2Rem[k]-1; j>=0; j--) {
            partialOffset[0][k] <<= 1
            partialOffset[1][k] <<= 1
            NodeSizeLog2Rem[k]--
            sameBit = same_bit[k][j] // same_bit[k][j] decoded using context idcmIdxjoint[k][j]
            idcmIdxJoint[k][j-1] = Min(4, idcmIdxjoint[k][j] + 1)
            bit = 0;
            if (!(samePrecComp[k] && !sameBit))
                bit = value_bit[k][j] // value_bit[k][j] decoded using bypass
            partialOffset[0][k] |= bit;
            partialOffset[1][k] |= sameBit ? bit : !bit;
            if (!sameBit) {
                for (k2 = k+1; k2 < 3; k2++)
                    samePrecComp[k2] = 0
                break
            }
        }
    }
}
```

10.8.4 Angular and Azimuthal Decoding of the Point Offsets
10.8.4.1 General The process in this section applies only when geometry_angular_enabled_flag is equal to 1. This process applies sub-processes described in the following sub-sections. Sub-section 9.8.4.2 is applied once, and then subsections 9.8.4.3 to 9.8.4.6 are applied to each point i belong to the current node.

10.8.4.2 Estimation of the Laser Index Associated with the Current Node

Based on the best knowledge (after planar inference and joint decoding) of the location of the first point belonging to the current node, an estimation laserIndexEstimate of the index of the laser that has probed the points.

Firstly, the best known 3D bestKnownPos location of the first point is obtained by bestKnownPos[0]=$sN$<<EffectiveNodeSize Log 2[0]

bestKnownPos[1]=$tN$<<EffectiveNodeSize Log 2[1]

bestKnownPos[2]=$vN$<<EffectiveNodeSize Log 2[2]

bestKnownPos[0]+=partialOffset[0][0]<<EffectiveNodeSize Log 2[0]−NodeSize Log 2Rem[0]

bestKnownPos[1]+=partialOffset[0][1]<<EffectiveNodeSize Log 2[1]−NodeSize Log 2Rem[1]

bestKnownPos[2]+=partialOffset[0][2]<<EffectiveNodeSize Log 2[2]−NodeSize Log 2Rem[2]

Secondly, the position bestKnownPos2Lidar[0] of the best known location in the co-ordinates used in the processing of the angular coding mode is deduced by

```
for (k = 0; k < 3; k++) {
    bestKnownPos2Lidar[k] = posNode2Lidar[k] - GeomAngularOrigin[k]
}
```

-continued

```
if (NodeSizeLog2Rem[k])
    bestKnownPos2Lidar[k] += 1 << (nodeSizeLog2Rem[k] - 1)
}
```

Thirdly, the angular value bestKnownAngle associated to this position is determined by sPoint=bestKnownPos2Lidar[0]<<8 tPoint=bestKnownPos2Lidar[1]<<8 r2=sPoint×sPoint+tPoint×tPoint rInvPoint=IntRecipSqrt(r2)

bestKnownAngle=bestKnownPos2Lidar[2]
　　*rInvPoint>>14

The laser index estimate laserIndexEstimate is obtained as the index of the laser with closest angle to bestKnownAngle as follows for (n=1;n<=number_lasers_minus1;n++)

if (LaserAngle[n]>bestKnownAngle)

break if (bestKnownAngle−LaserAngle[n−1]<=LaserAngle
　　[n]−bestKnownAngle)

n−− laserIndexEstimate=number_lasers_minus1?n:0

10.8.4.3 Bypass Decoding of a First Component S or T of Point_Offset

The component bypassSorT (whose value is 0 for S, and 1 for T) of the i-th point belonging to the current node is bypass decoded.

```
for (j = NodeSizeLog2Rem[byassSorT] - 1; j > 0; j--){
    partialOffset[i][bypassSorT] <<= 1
    partialOffset[i][bypassSorT] |= point_offset[i][bypassSorT][j]
    NodeSizeLog2Rem[bypassSorT]--
}
```

At the end of this sub-process, NodeSize Log 2Rem [bypassSorT] is equal to 0. There are no more bits to be decoded for the bypassSorT-th component of the point offset, and partialOffset[i][bypassSorT] is equal to the complete point offset PointOffset[i][bypassSorT].

10.8.4.4 Determination of the Laser Index Associated with a Point

A laser index residual laserIndexResidual[i], associated with the i-th point belonging to the current node, is deduced from the decoded values laserIndexResidual[i]=(1−2×laser_residual_sign_
　　flag)×(laser_residual_abs_gt0_flag+
　　laser_residual_abs_gt1_flag+
　　laser_residual_abs_gt2_flag+
　　laser_residual_abs_minus3_flag)

The laser index laserIndex[i], associated with the i-th point belonging to the current node, is then obtained by the sum laserIndex[i]=laserIndexEstimate+laserIndex-
　　Residual[i]

It is a requirement of bitstream conformance that laserIndex[i] shall be in the range 0 . . . number_lasers_minus1.

10.8.4.5 Azimuthal Decoding of a Second Component S or T of a Point Offset

The component 1-bypassSorT (whose value is 0 for S, and 1 for T) of the i-th points belonging to the current node is decoded using the azimuthal decoding mode.

Using the already decoded bits in partial offsets, the best known horizontal position of the point i, in the co-ordinates used in the processing of the angular coding mode, is computed by posPoint2LidarS[i]=(sN<<EffectiveNodeSize Log
　　2[0])−GeomAngularOrigin[0]

posPoint2LidarT[i]=(tN<<EffectiveNodeSize Log
　　2[1])−GeomAngularOrigin[1]

posPoint2LidarS[i]+=partialOffset[i][0]<<NodeSize
　　Log 2Rem[0]

posPoint2LidarT[i]+=partialOffset[i][1]<<NodeSize
　　Log 2Rem[1]

Then, an initial value of an azimuthal predictor predPhi is determined from the buffer phiBuffer.

phiNode=Int $A$ tan 2(posPoint2LidarT[i],
　　posPoint2LidarS[i])

predph=phiBuffer[laserIndex[i]]

if (predPhi==0x80000000)

predPhi=phiNode nShift=((predPhi−phiNode)*InvDeltaPhi[laserIndex
　　[i]]+536870912)>>30 predPhi−=DeltaPhi[laserIndex[i]]*nShift

The remaining of the point partial offset partialOffset[i] [1-bypassSorT] is iteratively decoded in a loop j on the remaining bits to decoded for the partial offset of the component 1-bypassSorT. In the loop, azimuthal contexts idcmIdxAzimuthal[i][j] are determined and are used to decode the syntax elements point_offset[i][1-bypassSorT] [j]. The position of the point, either posPoint2LidarS[i] or posPoint2Lidart[i] depending on the component involved in azimuthal decoding, is also updated iteratively.

```
mask = NodeSizeLog2Rem[1-bypassSorT] > 0
    ? 1 << NodeSizeLog2Rem[1-bypassSorT] - 1)
    : 0
for (j = NodeSizeLog2Rem[1-bypassSorT]-1; mask; j--, mask >>= 1){
    phiR = bypassSorT
        ? IntAtan2(posPoint2LidarT[i], posPoint2LidarS[i] + mask)
        : IntAtan2(posPoint2LidarT[i] + mask, posPoint2LidarS[i])
    phiL = phiNode
    angleL = phiL - predPhi
    angleR = phiR - predPhi
    contextAnglePhi = (angleL >= 0 && angleR >= 0) || (angleL < 0 && angleR < 0) ? 2 : 0
    angleL = Abs(angleL)
    angleR = Abs(angleR)
    if (angleL > angleR) {
        contextAnglePhi++
```

-continued

```
    int temp = angleL
    angleL = angleR
    angleR = temp
  }
  if (angleR > (angleL << 1))
    contextAnglePhi += 4
  idcmIdxAzimuthal[i][j] = contextAnglePhi
  // decode the bin point_offset[i][1-bypassSorT][j] using idcmIdxAzimuthal[i][j]
  partialOffset[i][1-bypassSorT] <<= 1
  partialOffset[i][1-bypassSorT] = point_offset[i][1-bypassSorT][j]
  if (point_offset[i][1-bypassSorT][j]) {
    if (bypassSorT)
      posPoint2LidarS[i] += mask
    else
      posPoint2LidarT[i] += mask
    phiNode = phiR
    predphi = phiBuffer[laserIndex[i]]
    if (predPhi == 0x80000000)
      predPhi = phiNode
    nShift = ((predPhi - phiNode) * InvDeltaPhi[laserindex[i]] + 536870912) >> 30
    predPhi -= DeltaPhi [laserindex [i]] * nShift
  }
}
```

The buffer phiBuffer[ ] is then updated
phiBuffer[laserIndex[i]]=phiNode

10.8.4.6 Angular Decoding of the Component V of a Point Offset

The last component V of the i-th points belonging to the current node is decoded using the angular decoding mode.

The horizontal positions posPoint2LidarS[i] and posPoint2LidarT[i] are known from the azimuthal decoding, and an inverse horizontal radial distance rInv is decoded by $sLidar=(posPoint2LidarS[i]<<8)-128$ $tLidar=(posPoint2LidarT[i]<<8)-128$ $r2=sLidar \times sLidar + tLidar \times tLidar$ $rInv=IntRecipSqrt(r2)$ Using the already decoded bits in partial offsets, the best known vertical position of the point i, in the co-ordinates used in the processing of the angular coding mode, is computed by $posPoint2LidarV[i]=(vN<<EffectiveNodeSize\ Log\ 2[2])-GeomAngularOrigin[2]$ $posPoint2LidarV[i]+=partialOffset[i][2]<<NodeSize\ Log\ 2Rem[2]$ The corrected laser angle ThetaLaser of the laser associated with the point is $Hr=LaserCorrection[laserIndex[i]] \times rInv$ $ThetaLaser=LaserAngle[laserIndex[i]]+(Hr>=0?\ (Hr>>17):((-Hr)>>17))$ The remaining of the point partial offset partialOffset[i][2] is iteratively decoded in a loop j on the remaining bits to decoded for the partial offset of the component V. In the loop, angular contexts idcmIdxAngular[i][j] are determined and are used to decode the syntax elements point_offset[i][2][j]. The position posPoint2LidarV[i] of the point is also updated iteratively.

```
mask = NodeSizeLog2Rem[2] > 0 ? 1 << NodeSizeLog2Rem[2] - 1) : 0
halfInterval = (rInv << NodeSizeLog2Rem [2]) >> 18
if (mask)
```

-continued

```
  for (j = NodeSizeLog2Rem[2]-1; j>=0; j--, mask >>= 1,
  halfInterval >>= 1){
    vLidar = ((posPoint2LidarV[i] + mask) << 1) - 1
    theta = vLidar × rInv
    theta32 = theta >= 0 ? theta >> 15 : -((-theta) >> 15)
    thetaLaserDeltaVirtualInterval = ThetaLaser - theta32
    deltaVirtualIntervalTop = thetaLaserDeltaVirtualInterval - halfInterval
    deltaVirtualIntervalBot = thetaLaserDeltaVirtualInterval + halfInterval
      idcmIdxAngular[i][j] = thetaLaserDeltaVirtualInterval < 0
    if (deltaVirtualIntervalTop >= 0)
      idcmIdxAngular[i][j] += 2
    else if (deltaVirtualIntervalBot < 0)
      idcmIdxAngular[i][j] += 2
    // decode the bin point_offset[i][2][j] using idcmIdxAngular [i][j]
    partialOffset[i][2] <<= 1
    partialOffset[i][2] = point_offset[i][2][j]
    if (point_offset[i][2][j])
      posPoint2LidarV[i] += mask
}
```

10.8.5 Bypass Decoding of all Components of Point Offsets

The process in this section applies only when geometry_angular_enabled_flag is equal to 0.

In this process, the remaining bits of the point offsets are determined by bypass decoding of the point_offset[i][k][j]. It is performed for each point index i and each component k as follows

```
for (i = 0; i < direct_point_cnt_eq2_flag; i++)
  for (k = 0; k < 3; k++)
    for (j = NodeSizeLog2Rem[k] - 1; j > 0; j--) {
      partialOffset[i][k] <<= 1
      partialOffset[i][k] |= point_offset[i][k][j]
      NodeSizeLog2Rem[k]--
    }
```

At the end of this process, NodeSize Log 2Rem[k] is equal to 0 for all k. There is no more bits to be decoded for the point offset, and partialOffset[i][k] is equal to the complete point offset PointOffset[i][k].

When in-tree quantization, angular mode and IDCM are jointly enabled, a scaled version of one or more of effective node sizes, point positions, and offsets may be used in the IDCM decoding process to ensure that the positions/offsets/node sizes and the angular origin are used at the same scale;

e.g., this may be useful in the proper derivation of the laser index and in the context derivation. Not using the scaled values may result in improper derivation of the laser indices or the contexts.

In the example of FIG. 2, G-PCC encoder 200 may include a coordinate transform unit 202, a color transform unit 204, a voxelization unit 206, an attribute transfer unit 208, an octree analysis unit 210, a surface approximation analysis unit 212, an arithmetic encoding unit 214, a geometry reconstruction unit 216, an RAHT unit 218, a LOD generation unit 220, a lifting unit 222, a coefficient quantization unit 224, memory 228, and an arithmetic encoding unit 226.

Memory 228 may be configured to store point cloud data, e.g., raw point cloud data, encoded point cloud data, and/or decoded point cloud data to be used as reference data for inter prediction.

As shown in the example of FIG. 2, G-PCC encoder 200 may obtain a set of positions of points in the point cloud and a set of attributes. G-PCC encoder 200 may obtain the set of positions of the points in the point cloud and the set of attributes from data source 104 (FIG. 1). The positions may include coordinates of points in a point cloud. The attributes may include information about the points in the point cloud, such as colors associated with points in the point cloud. G-PCC encoder 200 may generate a geometry bitstream 203 that includes an encoded representation of the positions of the points in the point cloud. G-PCC encoder 200 may also generate an attribute bitstream 205 that includes an encoded representation of the set of attributes.

Coordinate transform unit 202 may apply a transform to the coordinates of the points to transform the coordinates from an initial domain to a transform domain. This disclosure may refer to the transformed coordinates as transform coordinates. Color transform unit 204 may apply a transform to transform color information of the attributes to a different domain. For example, color transform unit 204 may transform color information from an RGB color space to a YCbCr color space.

Furthermore, in the example of FIG. 2, voxelization unit 206 may voxelize the transform coordinates. Voxelization of the transform coordinates may include quantization and removing some points of the point cloud. In other words, multiple points of the point cloud may be subsumed within a single "voxel," which may thereafter be treated in some respects as one point. Furthermore, octree analysis unit 210 may generate an octree based on the voxelized transform coordinates. Additionally, in the example of FIG. 2, surface approximation analysis unit 212 may analyze the points to potentially determine a surface representation of sets of the points. Arithmetic encoding unit 214 may entropy encode syntax elements representing the information of the octree and/or surfaces determined by surface approximation analysis unit 212. G-PCC encoder 200 may output these syntax elements in geometry bitstream 203. Geometry bitstream 203 may also include other syntax elements, including syntax elements that are not arithmetically encoded.

According to the techniques of this disclosure, arithmetic encoding unit 214 may determine how to encode occupancy data of a current node, e.g., whether the current node is occupied by at least one point and/or locations of points in the current node. In particular, arithmetic encoding unit 214 may determine whether an inferred direct coding mode (IDCM) mode is available for a current node according to whether the current node is inter predictable and/or whether angular mode is enabled for the current node. For example, if inter prediction is enabled for the current node and angular mode is disabled for the current mode, IDCM mode may be disabled for the current node. On the other hand, if either inter prediction is enabled for the current node or angular mode is enabled for the current node, IDCM mode may be enabled, and thus, used to encode occupancy data for the current node.

In some examples, when IDCM mode is enabled, arithmetic encoding unit 214 may further determine whether to enable position copy mode for the current node. In IDCM mode, arithmetic encoding unit 214 may encode position values for points in the current node directly. In position copy mode, arithmetic encoding unit 214 may predict the position values for the points of the current node from position values of a reference node for the current node. The prediction may result in directly copying the position values for the current node from those of the reference node, or arithmetic encoding unit 214 may further encode residual values representing position offsets for the position values of the current node relative to the position values of the reference node.

Geometry reconstruction unit 216 may reconstruct transform coordinates of points in the point cloud based on the octree, data indicating the surfaces determined by surface approximation analysis unit 212, and/or other information. The number of transform coordinates reconstructed by geometry reconstruction unit 216 may be different from the original number of points of the point cloud because of voxelization and surface approximation. This disclosure may refer to the resulting points as reconstructed points. Attribute transfer unit 208 may transfer attributes of the original points of the point cloud to reconstructed points of the point cloud.

Furthermore, RAHT unit 218 may apply RAHT coding to the attributes of the reconstructed points. In some examples, under RAHT, the attributes of a block of 2×2×2 point positions are taken and transformed along one direction to obtain four low (L) and four high (H) frequency nodes. Subsequently, the four low frequency nodes (L) are transformed in a second direction to obtain two low (LL) and two high (LH) frequency nodes. The two low frequency nodes (LL) are transformed along a third direction to obtain one low (LLL) and one high (LLH) frequency node. The low frequency node LLL corresponds to DC coefficients and the high frequency nodes H, LH, and LLH correspond to AC coefficients. The transformation in each direction may be a 1-D transform with two coefficient weights. The low frequency coefficients may be taken as coefficients of the 2×2×2 block for the next higher level of RAHT transform and the AC coefficients are encoded without changes; such transformations continue until the top root node. The tree traversal for encoding is from top to bottom and is used to calculate the weights to be used for the coefficients; the transform order is from bottom to top. The coefficients may then be quantized and coded.

Alternatively or additionally, LOD generation unit 220 and lifting unit 222 may apply LOD processing and lifting, respectively, to the attributes of the reconstructed points. LOD generation is used to split the attributes into different refinement levels. Each refinement level provides a refinement to the attributes of the point cloud. The first refinement level provides a coarse approximation and contains few points; the subsequent refinement level typically contains more points, and so on. The refinement levels may be constructed using a distance-based metric or may also use one or more other classification criteria (e.g., subsampling from a particular order). Thus, all the reconstructed points may be included in a refinement level. Each level of detail is produced by taking a union of all points up to particular refinement level: e.g., LOD1 is obtained based on refinement level RL1, LOD2 is obtained based on RL1 and RL2, . . . LODN is obtained by union of RL1, RL2, . . . RLN. In some cases, LOD generation may be followed by a prediction scheme (e.g., predicting transform) where attributes associated with each point in the LOD are predicted from a weighted average of preceding points, and the residual is quantized and entropy coded. The lifting scheme builds on top of the predicting transform mechanism, where an update operator is used to update the coefficients and an adaptive quantization of the coefficients is performed.

RAHT unit 218 and lifting unit 222 may generate coefficients based on the attributes. Coefficient quantization unit 224 may quantize the coefficients generated by RAHT unit 218 or lifting unit 222. Arithmetic encoding unit 226 may apply arithmetic coding to syntax elements representing the quantized coefficients. G-PCC encoder 200 may output these syntax elements in attribute bitstream 205. Attribute bitstream 205 may also include other syntax elements, including non-arithmetically encoded syntax elements.

In the example of FIG. 3, G-PCC decoder 300 may include a geometry arithmetic decoding unit 302, memory 324, an attribute arithmetic decoding unit 304, an octree synthesis unit 306, an inverse quantization unit 308, a surface approximation synthesis unit 310, a geometry reconstruction unit 312, a RAHT unit 314, a LoD generation unit 316, an inverse lifting unit 318, an inverse transform coordinate unit 320, and an inverse transform color unit 322.

G-PCC decoder 300 may obtain a geometry bitstream 203 and attribute bitstream 205. Geometry arithmetic decoding unit 302 of decoder 300 may apply arithmetic decoding (e.g., Context-Adaptive Binary Arithmetic Coding (CABAC) or other type of arithmetic decoding) to syntax elements in geometry bitstream 203. Similarly, attribute arithmetic decoding unit 304 may apply arithmetic decoding to syntax elements in attribute bitstream 205.

According to the techniques of this disclosure, geometry arithmetic decoding unit 302 may determine how to decode occupancy data of a current node. In particular, geometry arithmetic decoding unit 302 may determine whether an inferred direct coding mode (IDCM) mode is available for a current node according to whether the current node is inter predictable and/or whether angular mode is enabled for the current node. For example, if inter prediction is enabled for the current node and angular mode is disabled for the current mode, IDCM mode may be disabled for the current node. On the other hand, if either inter prediction is enabled for the current node or angular mode is enabled for the current node, IDCM mode may be enabled, and thus, used to decode occupancy data for the current node.

In some examples, when IDCM mode is enabled, geometry arithmetic decoding unit 302 may further determine whether to enable position copy mode for the current node. In IDCM mode, geometry arithmetic decoding unit 302 may decode position values for points in the current node directly. In position copy mode, geometry arithmetic decoding unit 302 may predict the position values for the points of the current node from position values of a reference node for the current node. The prediction may result in directly copying the position values for the current node from those of the reference node, or geometry arithmetic decoding unit 302 may further decode residual values representing position offsets for the position values of the current node relative to the position values of the reference node.

Octree synthesis unit 306 may synthesize an octree based on syntax elements parsed from geometry bitstream 203. Starting with the root node of the octree, the occupancy of each of the eight children node at each octree level is signaled in the bitstream. When the signaling indicates that a child node at a particular octree level is occupied, the occupancy of children of this child node is signaled. The signaling of nodes at each octree level is signaled before proceeding to the subsequent octree level. At the final level of the octree, each node corresponds to a voxel position; when the leaf node is occupied, one or more points may be specified to be occupied at the voxel position. In some instances, some branches of the octree may terminate earlier than the final level due to quantization. In such cases, a leaf node is considered an occupied node that has no child nodes. In instances where surface approximation is used in geometry bitstream 203, surface approximation synthesis unit 310 may determine a surface model based on syntax elements parsed from geometry bitstream 203 and based on the octree.

Furthermore, geometry reconstruction unit 312 may perform a reconstruction to determine coordinates of points in a point cloud. For each position at a leaf node of the octree, geometry reconstruction unit 312 may reconstruct the node position by using a binary representation of the leaf node in the octree. At each respective leaf node, the number of points at the respective leaf node is signaled; this indicates the number of duplicate points at the same voxel position. When geometry quantization is used, the point positions are scaled for determining the reconstructed point position values.

Inverse transform coordinate unit 320 may apply an inverse transform to the reconstructed coordinates to convert the reconstructed coordinates (positions) of the points in the point cloud from a transform domain back into an initial domain. The positions of points in a point cloud may be in floating point domain but point positions in G-PCC codec are coded in the integer domain. The inverse transform may be used to convert the positions back to the original domain.

Additionally, in the example of FIG. 3, inverse quantization unit 308 may inverse quantize attribute values. The attribute values may be based on syntax elements obtained from attribute bitstream 205 (e.g., including syntax elements decoded by attribute arithmetic decoding unit 304).

Depending on how the attribute values are encoded, RAHT unit 314 may perform RAHT coding to determine, based on the inverse quantized attribute values, color values for points of the point cloud. RAHT decoding is done from the top to the bottom of the tree. At each level, the low and high frequency coefficients that are derived from the inverse quantization process are used to derive the constituent values. At the leaf node, the values derived correspond to the attribute values of the coefficients. The weight derivation process for the points is similar to the process used at G-PCC encoder 200. Alternatively, LOD generation unit 316 and inverse lifting unit 318 may determine color values for points of the point cloud using a level of detail-based technique. LOD generation unit 316 decodes each LOD giving progressively finer representations of the attribute of points. With a predicting transform, LOD generation unit 316 derives the prediction of the point from a weighted sum of points that are in prior LODs, or previously reconstructed in the same LOD. LOD generation unit 316 may add the prediction to the residual (which is obtained after inverse quantization) to obtain the reconstructed value of the attribute. When the lifting scheme is used, LOD generation unit 316 may also include an update operator to update the coefficients used to derive the attribute values. LOD generation unit 316 may also apply an inverse adaptive quantization in this case.

Furthermore, in the example of FIG. 3, inverse transform color unit 322 may apply an inverse color transform to the color values. The inverse color transform may be an inverse of a color transform applied by color transform unit 204 of encoder 200. For example, color transform unit 204 may transform color information from an RGB color space to a YCbCr color space. Accordingly, inverse color transform unit 322 may transform color information from the YCbCr color space to the RGB color space.

The various units of FIG. 2 and FIG. 3 are illustrated to assist with understanding the operations performed by encoder 200 and decoder 300. The units may be implemented as fixed-function circuits, programmable circuits, or a combination thereof. Fixed-function circuits refer to circuits that provide particular functionality, and are preset on the operations that can be performed. Programmable circuits refer to circuits that can be programmed to perform various tasks, and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, one or more of the units may be distinct circuit blocks (fixed-function or programmable), and in some examples, one or more of the units may be integrated circuits.

Figure 4:
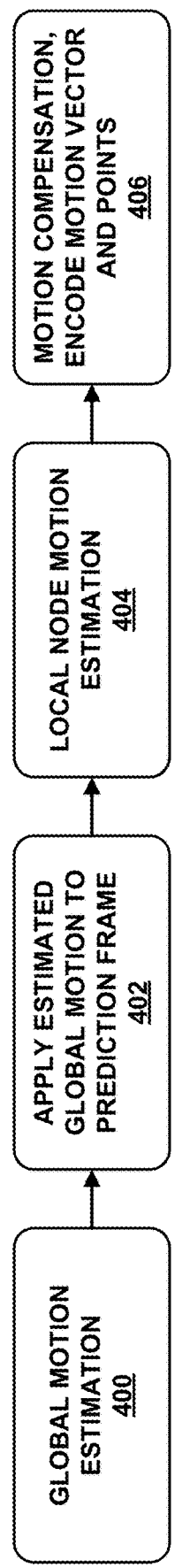
FIG. 4 is a flow diagram depicting an example process for performing motion-based inter prediction for G-PCC, in accordance with one or more techniques of this disclosure.

FIG. 4 is a flow diagram depicting an example process for performing motion-based inter prediction for G-PCC. G-PCC encoder 200 and G-PCC decoder 300 may be configured to perform motion prediction (i.e., inter prediction) as follows.

There are two kinds of motion involved in G-PCC InterEM software: global motion matrix and local node motion vector. Global motion parameters are defined as a rotation matrix and translation vector, which will be applied on all the points (except the points being applied local motion mode) in prediction (reference) frame. Local node motion vector of a node of the octree is a motion vector that is only applied on points within the node in prediction (reference) frame. Details of motion estimation algorithm in InterEM is described below. FIG. 4 depicts a flow diagram for the motion estimation algorithm.

Given input prediction (reference) frame and current frame, global motion is estimated first at a global scale. After applying global motion on prediction, local motion is estimated at a finer scale, i.e., node level in octree. Finally, the estimated local node motion is applied in motion compensation.

Figure 5:
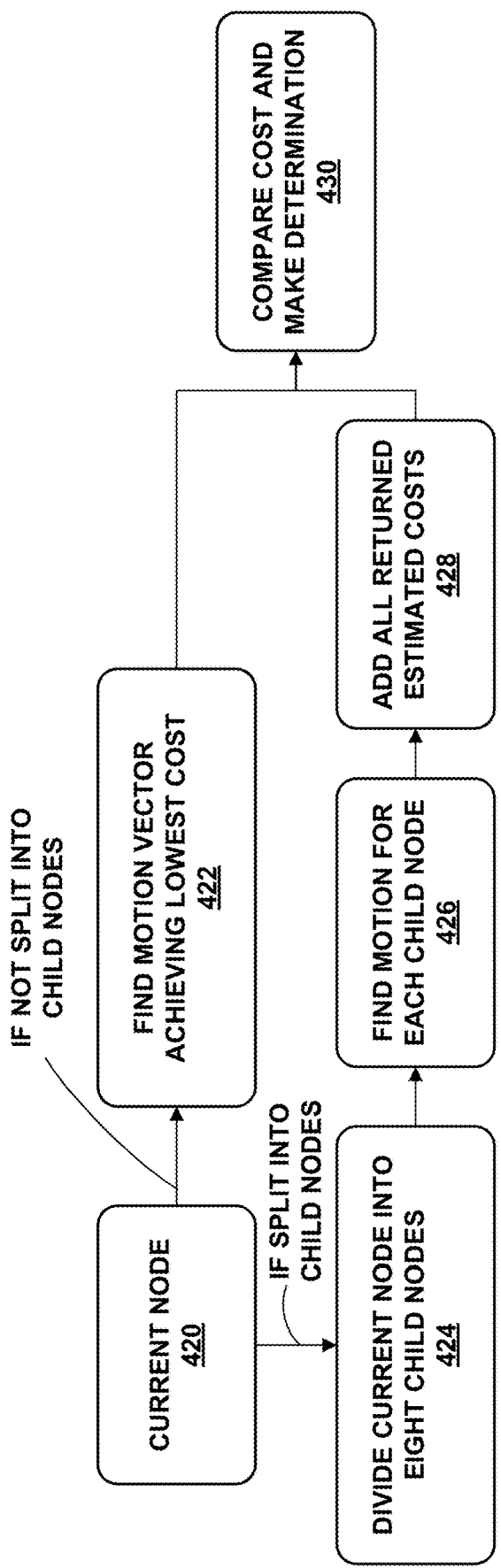
FIG. 5 is a flow diagram illustrating an example process for estimation of a local node motion vector, in accordance with one or more techniques of this disclosure.

FIG. 5 is a flow diagram illustrating an example process for estimation of a local node motion vector. G-PCC encoder 200 and G-PCC decoder 300 may estimate a local node motion vector in a recursive manner according to FIG. 5. The cost function used for choosing the best suitable motion vector is based on the Rate-Distortion cost.

If a current node is not split into 8 children, the motion vector that could result in the lowest cost between current node and prediction node is determined. If the current node is divided into 8 children, the motion estimation algorithm is applied and the total cost under split condition is obtained by adding the estimated cost value of each child node. The decision whether to split or not to split is arrived by comparing the cost between splitting and not splitting; if split, each sub-node is assigned its respective motion vector (or may be further split to its children), if not split, the current node is assigned the motion vector.

Two parameters that affect the performance of motion vector estimation are block size (BlockSize) and minimum prediction unit size (MinPUSize). BlockSize defines the upper bound of node size to apply motion vector estimation and MinPUSize defines the lower bound.

G-PCC encoder 200 and G-PCC decoder 300 may perform inter prediction according to occupancy coding, including planar mode coding with angular mode disabled.

Figure 6:
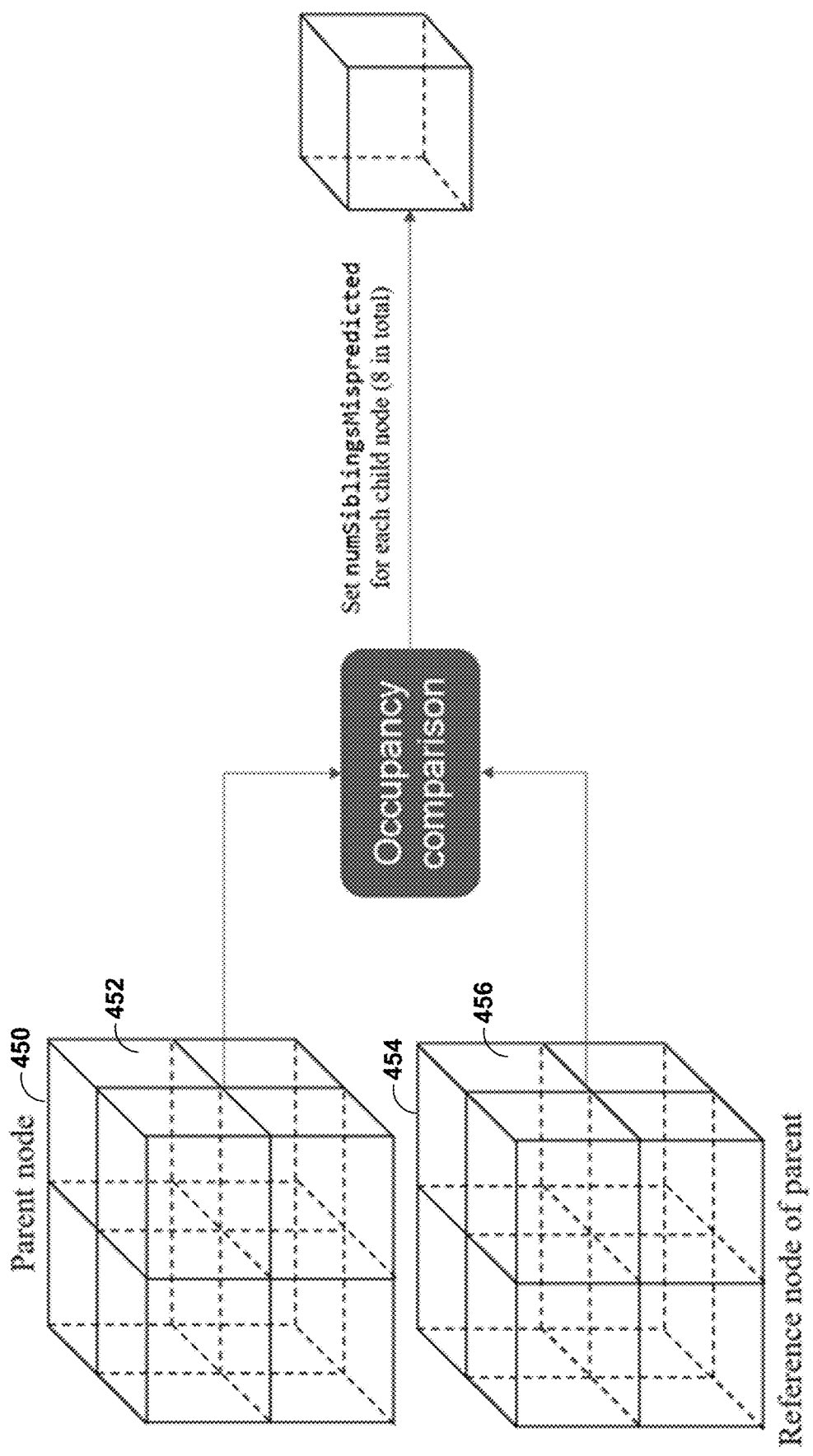
FIG. 6 is a conceptual diagram illustrating an example of performing occupancy comparison for inter prediction in G-PCC, in accordance with one or more techniques of this disclosure.

FIG. 6 is a conceptual diagram illustrating an example of performing occupancy comparison for inter prediction in G-PCC. G-PCC encoder 200 and G-PCC decoder 300 may compare current node 452 of parent node 450 of an octree to reference node 456 for parent reference node 454. Reference node 456 is a collocated node in a reference frame to current node 452 of a current frame. G-PCC encoder 200 and G-PCC decoder 300 may derive a prediction frame from the reference using a global motion vector applied to the reference frame. When parent reference node 454 is obtained, G-PCC encoder 200 and G-PCC decoder 300 may split parent reference node 454 into 8 cubic child nodes with the same size, which includes reference node 456.

G-PCC encoder 200 and G-PCC decoder 300 may count points in each child node of parent reference node 454 to form an inter prediction occupancy value (predOccupancy, which may be an array of binary values) and a prediction occupancy strong value (predOccupancyStrong). The predOccupancy data structure may be an array of eight bits, indexed 0 to 7. In some examples, if there is at least one point in a child node of parent reference node 454, the corresponding bit (i out of 8 bits, i.e., 0 to 7), predOccupancy [i], is set equal to 1. Otherwise, the corresponding bit of the predOccupancy array is set equal to 0. In some examples, if the number of points in a child node is larger than 2, the corresponding bit in predOccupancyStrong (which may also be an array of eight bits, indexed 0 to 7) is set equal to 1; otherwise, this bit is set equal to 0.

The quality of the inter prediction is then evaluated by a parameter called 'occupancyIsPredictable'. The value of occupancyIsPredictable for a node is derived according to the number of siblings having missed predictions. In particular, if the occupancy bit of a child node in a parent node and the occupancy bit of the corresponding reference node in the parent reference node are different, the child node is considered to have missed prediction. G-PCC encoder 200 and G-PCC decoder 300 may calculate the number of siblings having missed predictions (numSiblingsMispredicted) by comparing the occupancy of parent node 450 with the occupancy of parent reference node 454, as illustrated in FIG. 6. If the predOccupancy of the current node is 0 or the number of siblings missed predictions is larger than 5, occupancyIsPredictable is set equal to 0. Otherwise, it is set equal to 1. Thus, in one example, a threshold value of 5 may be used to determine whether the node is inter predictable.

G-PCC encoder 200 and G-PCC decoder 300 may use occupancyIsPredictable to update predOccupancy, predOccupancyStrong, planar copy mode eligibility and IDCM eligibility. If occupancyIsPredictable is equal to 0, predOccupancy, predOccupancyStrong, and planar copy mode eligibility are set equal to 0. If occupancyIsPredictable is 1, IDCM is disabled for this node in conventional InterEM.

Figure 7:
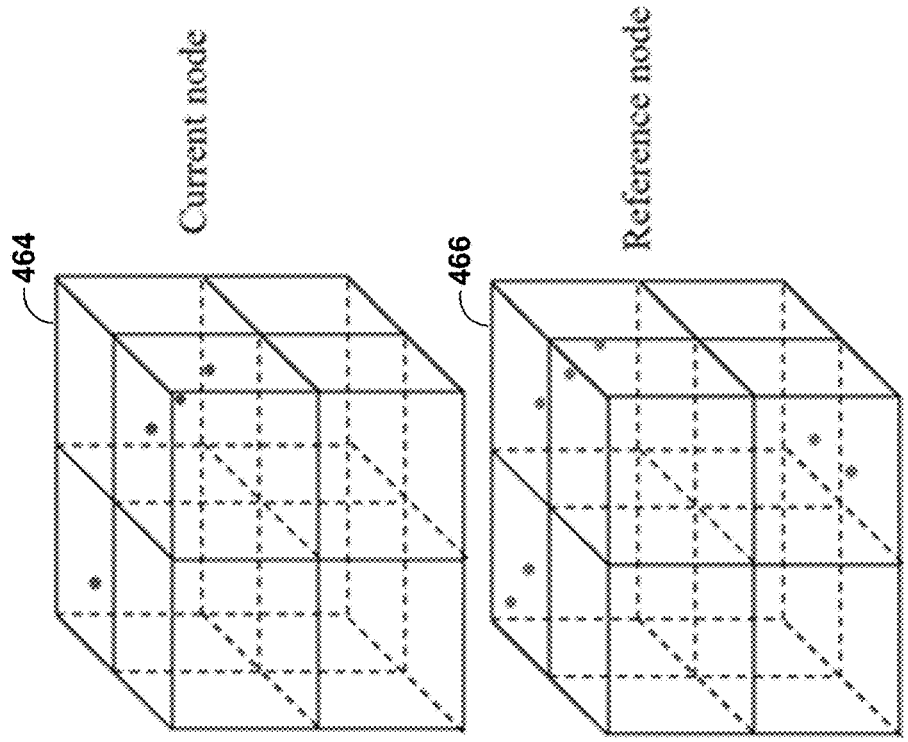
FIG. 7 is a conceptual diagram illustrating planar coding mode (PCM) for G-PCC, in accordance with one or more techniques of this disclosure.
Figure 7:
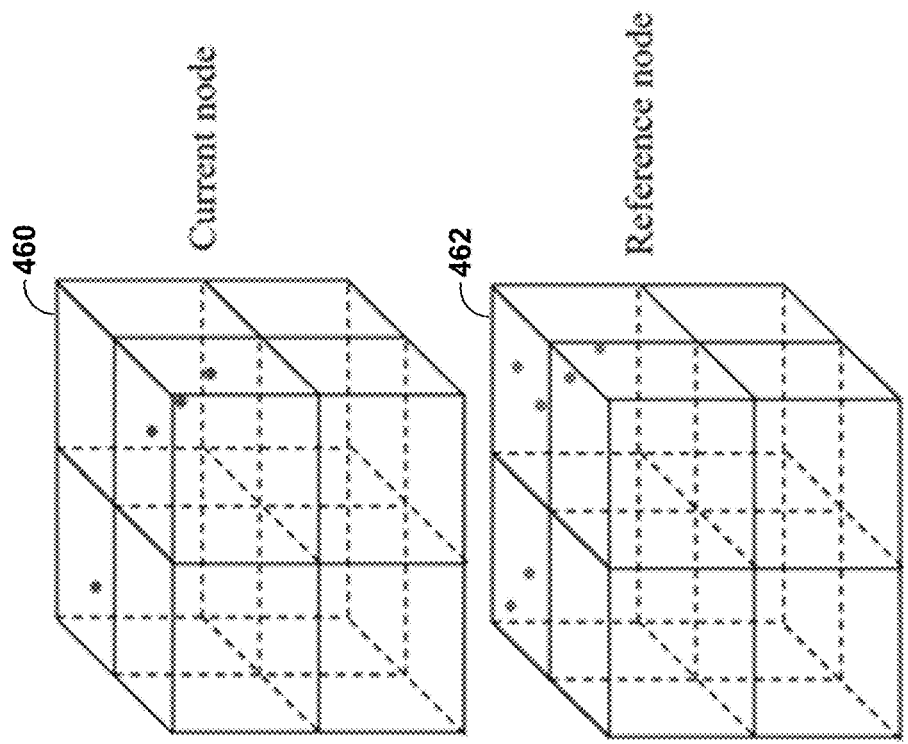

FIG. 7 is a conceptual diagram illustrating planar coding mode (PCM) for G-PCC. In particular, a node may be said to be planar in a particular direction (e.g., X-, Y-, and Z-directions) if all points are either in a single plane of the direction or in both planes of the direction. There may be two planes in each direction: for example, a left plane and a right plane for the X-direction, a top plane and a bottom plane for the Y-direction, and a front plane and a back plane for the Z-direction.

In planar mode, if a node is coded using planar copy mode (PCM), the planar information of this node is not signaled in the bitstream. Instead, e.g., for current node 460, the planar mode and plane position in three directions of in PCM are copied from the planar information of reference node 462, which may be generated from predOccupancy. Examples of PCM coded current node 460 and non-PCM coded node 464 are illustrated in FIG. 7. For non-PCM coded node 464, the planar information of reference node 466 is used to provide more flexibility in the context selection of planar mode and plane position coding.

G-PCC encoder 200 and G-PCC decoder 300 may be configured to perform inter prediction according to occupancy coding. Inter prediction may be used to improve occupancy coding, particularly it is used in context selection to encode occupancy bits of the current node. This is presented in GeometryOctreeEncoder::encodeOccupancyNeighNZ( ) and GeometryOctreeEncoder::encodeOccupancyNeighZ( ) functions as follows:

```
// This part is to encode the occupancy bit of a child node of the
current node.
   int ctxIdxMapIdx = 4 * idxAdj; // This part is obtained using the
occupancy of adjacent nodes
   ctxIdxMapIdx = 4 * idxAdj + bitIsPredicted + bitPrediction
// Intra prediction
      + !!mappedPred + bitPred + bitPredStrong; // Inter prediction
   . . .
   auto& ctxIdxMap = _ctxIdxMaps[ctxIdxMapIdx];
   ctxIdx = ctxIdxMap.evolve(bit, &ctxIdxMap[i]
   [numOccupiedAcc]);
_arithmeticEncoder->encode(bit, _ctxOccupancy[ctxIdx]);
```

In the above example pseudocode, idxAdj is decided using the occupancy of the adjacent nodes. bitIsPredicted and bitPrediction are the occupancy bits derived using intra prediction. In the inter frame, these parameters are set equal to 0. The value "!!mappedPred" indicates whether the prediction occupancy of the inter reference block is zero or not. bitPred and bitPredStrong are corresponding bits of the child node in the predOccupancy and predOccupancyStrong.

This disclosure recognizes that, in the current InterEM version 3 for G-PCC, the inter prediction provides significant coding efficiency for both lossy-lossy and lossless-lossless configurations. It is noted that, in the current InterEM version 3, if a node is inter predictable, the IDCM mode is disabled for the child nodes. In this case, the encoder and decoder runtime are significantly increased for the lossless-lossless case. When the use of angular is enabled, the overhead of coding IDCM node is notably reduced. Therefore, when the number of IDCM nodes is reduced by using a determination of whether a node is inter predictable the benefit of IDCM is reduced and that reduces the coding efficiency.

This disclosure describes various techniques that may be used to address the problems noted above, as well as to improve the coding of IDCM mode using inter prediction, particularly position coding of points in G-PCC.

In some examples, when a node is inter predictable, the IDCM mode is not allowed. Otherwise, the allowance of IDCM mode is based on the IDCM mode, the node size, and the number of siblings per isDirectModeEligible( ), which as may be defined as follows:

```
inline bool
isDirectModeEligible(
   int intensity, // IDCM mode, it based on the configuration
   int nodeSizeLog2,
   int nodeNeighPattern,
   const PCCOctree3Node& node,
   const PCCOctree3Node& child,
   bool occupancyIsPredictable
)
{
   if (intensity) // IDCM mode 0, not use IDCM at all
      return false;
   if (occupancyIsPredictable)
      return false;
   if (intensity == 1)
      return (nodeSizeLog2 >= 2) && (nodeNeighPattern == 0)
         && (child.numSiblingsPlus1 == 1) &&
         (node.numSiblingsPlus2 <= 2);
   if (intensity == 2)
      return (nodeSizeLog2 >= 2) && (nodeNeighPattern == 0);
   // This is basically unconditionally enabled.
   // If a node is that is IDCM-eligible is not coded with IDCM and
   has only
   // one child, then it is likely that the child would also not be able to
   // be coded with IDCM (e.g., it still contains > 2 unique points).
   if (intensity == 3)
      return (nodeSizeLog2 >= 2) && (child.numSiblingsPlus1 > 1);
   return false;
}
```

According to the techniques of this disclosure, G-PCC encoder 200 and G-PCC decoder 300 may be configured to use a modified IDCM eligibility check to control the trade-off of IDCM mode more adaptively. In one example, inter prediction is not used in the IDCM eligibility, so the above function may be modified as follows, where "removed" indicates removals from the G-PCC standard:

```
inline bool
isDirectModeEligible(
int intensity, // IDCM mode, it based on the configuration
   int nodeSizeLog2,
   int nodeNeighPattern,
   const PCCOctree3Node& node,
   const PCCOctree3Node& child,
   bool occupancyIsPredictable
)
{
   if (intensity) // IDCM mode 0, not use IDCM at all
      return false;
   [removed: "if (occupancyIsPredictable)
      return false;"]
   if (intensity == 1)
      return (nodeSizeLog2 >= 2) && (nodeNeighPattern == 0)
         && (child.numSiblingsPlus1 == 1) &&
         (node.numSiblingsPlus1 <= 2);
```

In another example, G-PCC encoder 200 and G-PCC decoder 300 may use inter prediction in the IDCM eligibility check dependent on the angular mode. For example, if the angular mode is disabled and the node is inter predictable, the IDCM mode may not be allowed for this node. The above function may be updated accordingly as follows, where "added" indicates additions relative to the G-PCC standard and "modified" represents modifications to the G-PCC standard:

```
inline bool
isDirectModeEligible(
   int intensity, // IDCM mode, it based on the configuration
   int nodeSizeLog2,
   int nodeNeighPattern,
```

-continued

```
  const PCCOctree3Node& node,
  const PCCOctree3Node& child,
  bool occupancyIsPredictable
  [added: "bool angularModeIsEnabled"] // This is set in the
    configuration file
)
}
  if (intensity) // IDCM mode 0, not use IDCM at all
    return false;
  [modified: "if (occupancyIsPredictable && !angularModeIsEnabled)
    return false;"]
```

In this example, if a current node both has a true value of occupancyIsPredictable (i.e., the node is inter predictable) and angular mode is not enabled, IDCM mode is disabled for the node. Otherwise, that is, if the current node is not inter predictable or angular mode is enabled, then IDCM mode may be enabled for the current node.

As discussed above, to determine whether a node is inter predictable, G-PCC encoder 200 and G-PCC decoder 300 may determine whether sibling nodes to the node were predicted correctly or had prediction misses (i.e., missed predictions), which may be determined according to the techniques discussed above. If the number of missed predictions meets or exceeds a threshold value, G-PCC encoder 200 and G-PCC decoder 300 may determine that the node is not inter predictable. On the other hand, if the number of missed predictions is less than or equal to the threshold, G-PCC encoder 200 and G-PCC decoder 300 may determine that the node is inter predictable.

G-PCC encoder 200 may test angular mode for a node and determine a rate-distortion optimization (RDO) value using angular mode for the node. If the RDO value indicates that angular mode should be enabled for the node, G-PCC encoder 200 may encode a value for a syntax element indicating that angular mode is enabled for the node. On the other hand, if the RDO value indicates that angular mode should not be enabled for the node, G-PCC encoder 200 may encode a value for the syntax element indicating that angular mode is disabled for the node. G-PCC decoder 300 may determine whether angular mode is enabled for the node using the value of the syntax element. The syntax element may be, e.g., angularModeIsEnabled, as shown above.

In another example, G-PCC encoder 200 and G-PCC decoder 300 may use inter predictability in selection of the condition of IDCM eligibility, as follows, where "removed" indicates a removal relative to the G-PCC standard and "added" indicates an addition relative to the G-PCC standard:

```
inline bool
isDirectModeEligible(
  int intensity, // IDCM mode, it based on the configuration
  int nodeSizeLog2,
  int nodeNeighPattern,
  const PCCOctree3Node& node,
  const PCCOctree3Node& child,
  bool occupancyIsPredictable
)
{
  if (intensity) // IDCM mode 0, not use IDCM at all
    return false;
  [removed: "if (occupancyIsPredictable)
    return false;"]
  if (intensity == 1 [[added: "|| occupancyIsPredictable")
    return (nodeSizeLog2 >= 2) && (nodeNeighPattern == 0)
      && (child.numSiblingsPlus1 == 1) &&
      (node.numSiblingsPlus1 <= 2);
```

```
  if (intensity == 2)
    return (nodeSizeLog2 >= 2) && (nodeNeighPattern == 0);
. . .
```

In another example, G-PCC encoder 200 and G-PCC decoder 300 may be configured to perform the following:

```
inline bool
isDirectModeEligible(
  int intensity, // IDCM mode, it based on the configuration
  int nodeSizeLog2,
  int nodeNeighPattern,
  const PCCOctree3Node& node,
  const PCCOctree3Node& child,
  bool occupancyIsPredictable
)
{
  if (intensity) // IDCM mode 0, not use IDCM at all
    return false;
  [removed: "if (occupancyIsPredictable)
    return false;"]
  if (intensity == 1)
    return (nodeSizeLog2 >= 2) && (nodeNeighPattern == 0)
      && (child.numSiblingsPlus1 == 1) &&
      (node.numSiblingsPlus1 <= 2);
  if (intensity == 2 [added: "|| occupancyIsPredictable")
    return (nodeSizeLog2 >= 2) && (nodeNeighPattern == 0);
. . .
```

G-PCC encoder 200 and G-PCC decoder 300 may be configured to perform a position copy mode with RD check for an IDCM mode (referred to as "PCMI mode"), as follows. If a node is coded as PCMI, the positions of the points in this node may be copied from the positions of the points in the reference node. A flag may be signaled to indicate whether the node is encoded using PCMI mode or not.

G-PCC encoder 200 and G-PCC decoder 300 may determine PCMI mode eligibility as follows: The PCMI mode may be applied to only a node in certain depths, which may be signaled in a header or parameter set. The PCMI mode may be applied to only a node which has a reference node with a certain number of points. For example, if the reference node has at most 3 points, the current node may be encoded with PCMI. The PCMI eligibility may be set in the configuration file, and it is signaled to the decoder. For example, the PCMI may not be applied to lossless-lossless case.

In some examples, the PCMI mode may be applied to PCM nodes.

G-PCC encoder 200 may be configured to determine whether to use PCMI mode according to an optimization of rate and distortion (RDO). The distortion may be calculated by the sum of difference between the position of the nodes in the reconstructed point and the original points. Optionally, a position residual is coded in the bitstream and the rate. For a non-PCMI node, the rate is the number of bits to signal the number of points and the positions of the points.

G-PCC encoder 200 and G-PCC decoder 300 may be configured to perform an improved version of joint position coding. In particular, points in a reference node may be used in joint coding with the points in the current node. It should be noted that, the joint coding technique is restricted to only the nodes which have two points. In the technique of this disclosure, using the reference points in joint coding, this restriction may be relaxed.

Example cases of joint coding are shown in the following table:

| Example | Number of points in reference node | Number of points in current node | Reference point |
|---|---|---|---|
| 1 | 1 | 1 | Point in reference node |
| 2 | 1 | 2 | Point in reference node |
| 3 | 2 or higher | 1 | Average position in each direction of points in reference node |
| 4 | 2 or higher | 1 | Median position in each direction of points in reference node |
| 5 | 2 or higher | 1 | Maximum position in each direction of points in reference node |
| 6 | 2 or higher | 1 | Minimum position in each direction of points in reference node |
| 7 | 2 | 2 | Points in reference node is sorted (sorted reference list). Points in current node is sorted (sorted current list). First point in sorted reference list is the reference for first point in sorted current list. Second point in sorted reference list is the reference for second point in sorted current list. |

EXAMPLE JOINT CODING CASES

Whereas in some techniques, when the bits of two points are the same (same_bit[k][j]=true, k is the direction index, j is the bit index in the position), value_bit[k][j] is bypass encoded. However, in the techniques of this disclosure, G-PCC encoder 200 and G-PCC decoder 300 may avoid coding value_bit[k][j], as it can be taken from the bit value in the reference point.

In some examples, the joint position coding may be applied to only the directions in which the current node and reference node share the same planar information including planar mode and plane position.

G-PCC encoder 200 and G-PCC decoder 300 may be configured to perform techniques of this disclosure that may improve context selection for coding point offsets. The laser index associated with the current node is used to decide the angular or azimuthal which will be used to select the context to encode the corresponding component of the point offset. Specifically, azimuthal is used to select context in encoding a second component S or T of a point offset (Section 10.8.4.5 of the G-PCC standard), while angular is used to select context in encoding the component V of a point offset (Section 10.8.4.6 of the current G-PCC standard).

According to the techniques of this disclosure, G-PCC encoder 200 and G-PCC decoder 300 may use the points in the reference node to adaptively select the context for encoding or decoding components of a point offset. A reference point may be defined to represent the points in the reference node. The reference point may be a function of positions of the points in the reference node. In one example, the reference point may be the average position of the points in the reference node. In another example, the reference point may be the median position of the points in the reference node. In yet another example, the reference point may be the maximum position of the points in the reference node. In a further example, the reference point may be the maximum position of the points in the reference node.

G-PCC encoder 200 and G-PCC decoder 300 may be configured to perform context selection in point offsets coding using a reference point as follows:

6.2.4.1 Reference Point Used in Context Selection of Encoding the Component V of a Point Offset In this example, the component z (height) of the reference point may be used to select the context. The context index based on the z may be decided as follows:

| | |
|---|---|
| ctxRefZ = (z − node position in vertical direction)/ n; | 0 |
| where n is a positive and non-zero integer number. | 1 |
| | ... |
| | n −1 |

Section 10.8.4.6 may be updated as follows:

```
mask = NodeSizeLog2Rem[2] > 0 ? 1 << NodeSizeLog2Rem[2] − 1) : 0
halfInterval = (rInv << NodeSizeLog2Rem [2]) >> 18
if (mask)
    for (j = NodeSizeLog2Rem[2]−1; j>=0; j−−, mask >>= 1, halfInterval >>− 1){
        vLidar = ((posPoint2LidarV[i] + mask) << 1) − 1
        theta = vLidar × rInv
        theta32 = theta >= 0 ? theta >> 15 : −((−theta) >> 15)
        thetaLaserDeltaVirtualInterval = ThetaLaser − theta32
        deltaVirtualIntervalTop = thetaLaserDeltaVirtualInterval − halfInterval
        deltaVirtualIntervalBot = thetaLaserDeltaVirtualInterval + halfInterval
        idcmIdxAngular[i][j] = thetaLaserDeltaVirtualInterval < 0
        if (deltaVirtualIntervalTop >= 0)
            idcmIdxAngular[i][j] += 2
        else if (deltaVirtualIntervalBot < 0)
            idcmIdxAngular[i][j] += 2
        [added: "ctxRefZ = (z − node position in vertical direction)/ n
        // decode the bin point_offset[i][2][j] using idcmIdxAngular [i][j][ ctxRefZ]"]
        partialOffset[i][2] <<= 1
        partialOffset[i][2] = point_offset[i][2][j]
        if (point_offset[i][2][j])
            posPoint2LidarV[i] += mask
}
```

For example, node position in vertical direction may be associated with the vertical coordinate of a node boundary plane that is perpendicular to the vertical axis.

In one example, the value of n may be chosen as dependent on the node size. For example, for larger node sizes, larger values of n may be chosen. In another example, the value of context index may be inferred as following: ctxRefZ=(z−node position in vertical direction)*T/n, where T is chosen dependent on the node size. For smaller values of node sizes, the value of T is larger and vice versa.

As another example, the value of ctxRefZ for each bin may be re-calculated after updating z based on previous decoded bins. Similar techniques may be applied to coding of S or T point offsets, as shown below:

6.2.4.2 Reference Point Used in Context Selection of Encoding a Second Component S or T of a Point Offset

```
mask = NodeSizeLog2Rem[1-bypassSorT] > 0
  ? 1 << NodeSizeLog2Rem[1-bypassSorT] - 1)
  : 0
for (j = NodeSizeLog2Rem[1-bypassSorT]-1; mask; j--, mask >>= 1){
  phiR = bypassSorT
    ? IntAtan2(posPoint2LidarT[i], posPoint2LidarS[i] + mask)
    : IntAtan2(posPoint2LidarT[i] + mask, posPoint2LidarS[i])
  phiL = phiNode
  angleL = phiL - predPhi
  angleR = phiR - predPhi
  contextAnglePhi = (angleL >= 0 && angleR >= 0) || (angleL < 0 && angleR < 0) ? 2 : 0
  angleL = Abs(angleL)
  angleR = Abs(angleR)
  if (angleL > angleR) {
    contextAnglePhi++
    int temp = angleL
    angleL = angleR
    angleR = temp
  }
  if (angleR > (angleL << 1))
    contextAnglePhi += 4
  idcmIdxAzimuthal[i][j] = contextAnglePhi
  [added: "ctxRef = (ref – node position)/ n
  // ref and node position are corresponding to which component is being encoded.
  // decode the bin point_offset[i][1-bypassSorT][j] using
  idcmIdxAzimuthal[i][j][ ctxRef]"]
  partialOffset[i][1-bypassSorT] <<= 1
  partialOffset[i][1-bypassSorT] = point_offset[i][1-bypassSorT][j]
  if (point_offset[i][1-bypassSorT][j]) {
    if (bypassSorT)
      posPoint2LidarS[i] += mask
    else
      posPoint2LidarT[i] += mask
  phiNode = phiR
  predphi = phiBuffer[laserIndex[i]]
  if (predPhi == 0x80000000)
    predPhi = phiNode
  nShift = ((predPhi - phiNode) * InvDeltaPhi[laserindex[i]] + 536870912) >> 30
  predPhi -= DeltaPhi [laserindex[i]] * nShift
  }
}
```

Figure 8:
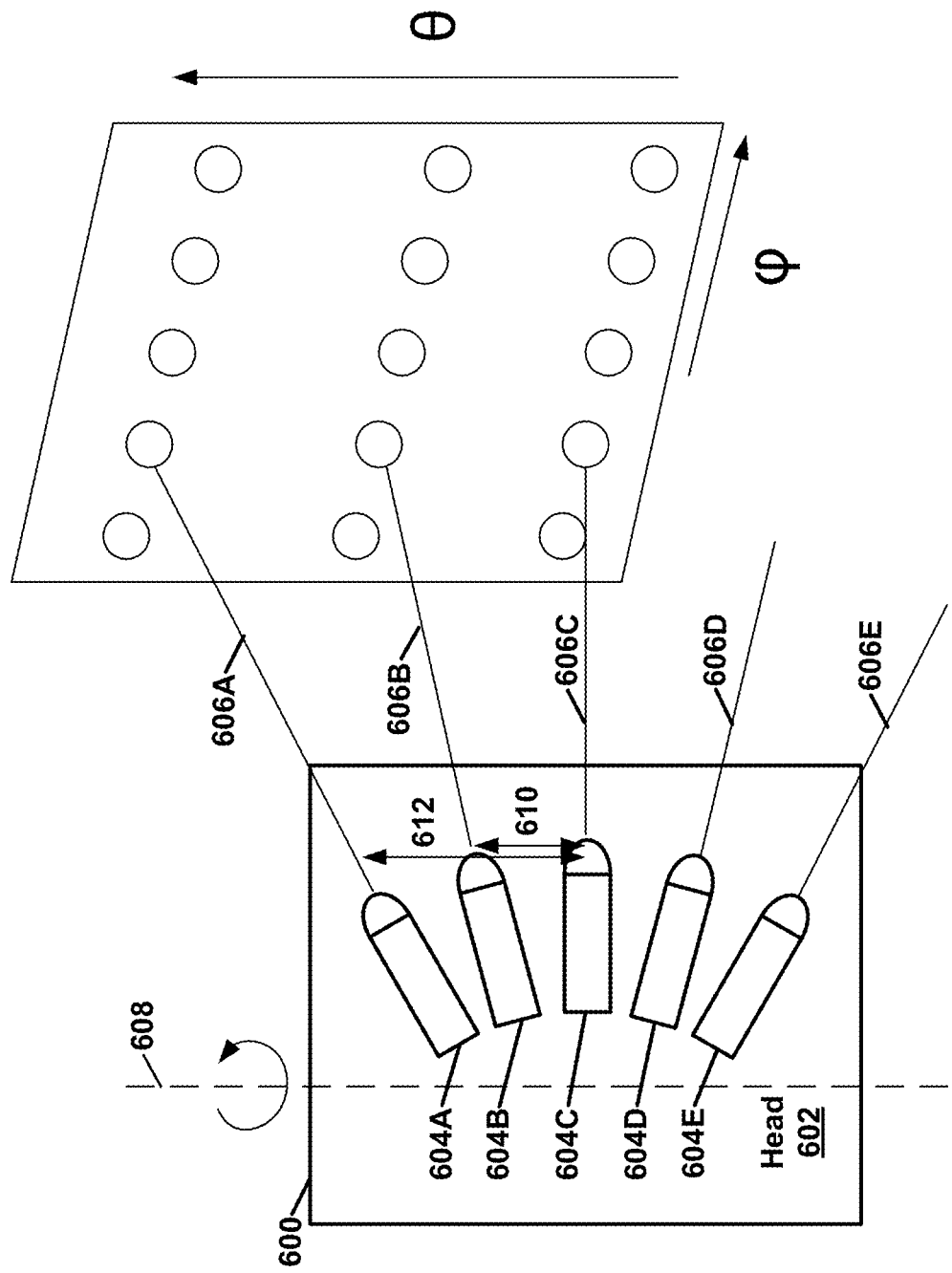
FIG. 8 is a conceptual diagram illustrating a laser package, such as a LIDAR sensor or other system that includes one or more lasers, scanning points in 3-dimensional space, in accordance with one or more techniques of this disclosure.

FIG. 8 is a conceptual diagram illustrating a laser package 600, such as a LIDAR sensor or other system that includes one or more lasers, scanning points in 3-dimensional space. Data source 104 (FIG. 1) may include laser package 600.

As shown in FIG. 8, point clouds can be captured using laser package 600, i.e., the sensor scans the points in 3D space. It is to be understood, however, that some point clouds are not generated by an actual LIDAR sensor but may be encoded as if they were. In the example of FIG. 8, laser package 600 includes a LIDAR head 602 that includes multiple lasers 604A-604E (collectively, "lasers 604") arrayed in a vertical plane at different angles relative to an origin point. Laser package 600 may rotate around a vertical axis 608. Laser package 600 may use returned laser light to determine the distances and positions of points of the point cloud. Laser beams 606A-606E (collectively, "laser beams 606") emitted by lasers 604 of laser package 600 may be characterized by a set of parameters. Distances denoted by arrows 610, 612 denotes an example laser correction values for laser 604B, 604A, respectively.

Figure 9:
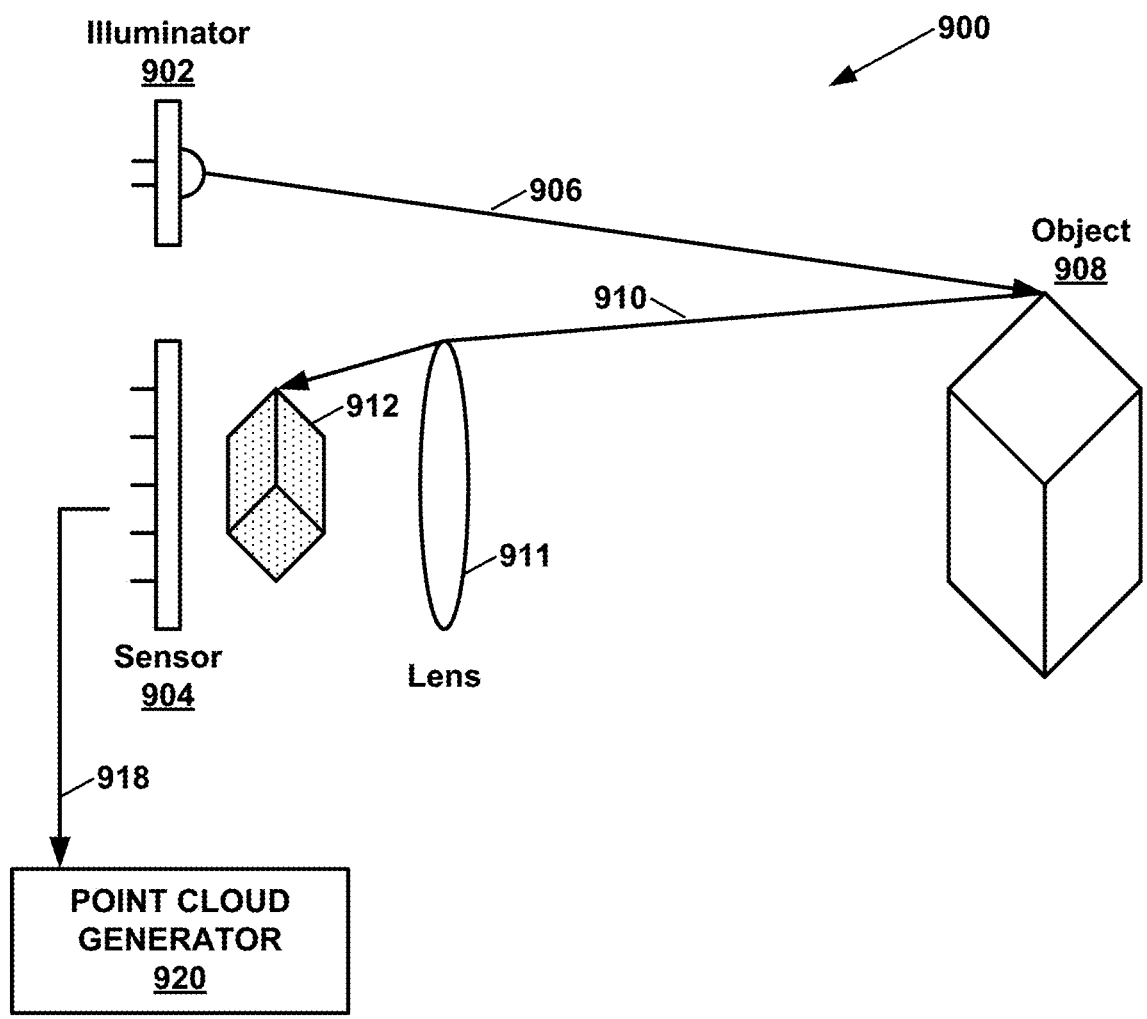
FIG. 9 is a conceptual diagram illustrating an example range-finding system that may be used with one or more techniques of this disclosure.

FIG. 9 is a conceptual diagram illustrating an example range-finding system 900 that may be used with one or more techniques of this disclosure. In the example of FIG. 9, range-finding system 900 includes an illuminator 902 and a sensor 904. Illuminator 902 may emit light 906. In some examples, illuminator 902 may emit light 906 as one or more laser beams. Light 906 may be in one or more wavelengths, such as an infrared wavelength or a visible light wavelength. In other examples, light 906 is not coherent, laser light. When light 906 encounters an object, such as object 908, light 906 creates returning light 910. Returning light 910 may include backscattered and/or reflected light. Returning light 910 may pass through a lens 911 that directs returning light 910 to create an image 912 of object 908 on sensor 904. Sensor 904 generates signals 914 based on image 912. Image 912 may comprise a set of points (e.g., as represented by dots in image 912 of FIG. 9).

In some examples, illuminator 902 and sensor 904 may be mounted on a spinning structure so that illuminator 902 and sensor 904 capture a 360-degree view of an environment. In other examples, range-finding system 900 may include one or more optical components (e.g., mirrors, collimators, diffraction gratings, etc.) that enable illuminator 902 and sensor 904 to detect objects within a specific range (e.g., up to 360-degrees). Although the example of FIG. 9 only shows a single illuminator 902 and sensor 904, range-finding system 900 may include multiple sets of illuminators and sensors.

In some examples, illuminator 902 generates a structured light pattern. In such examples, range-finding system 900 may include multiple sensors 904 upon which respective images of the structured light pattern are formed. Range-finding system 900 may use disparities between the images of the structured light pattern to determine a distance to an object 908 from which the structured light pattern backscatters. Structured light-based range-finding systems may have a high level of accuracy (e.g., accuracy in the sub-millimeter range), when object 908 is relatively close to sensor 904 (e.g., 0.2 meters to 2 meters). This high level of accuracy may be useful in facial recognition applications, such as unlocking mobile devices (e.g., mobile phones, tablet computers, etc.) and for security applications.

In some examples, range-finding system 900 is a time of flight (ToF)-based system. In some examples where range-finding system 900 is a ToF-based system, illuminator 902 generates pulses of light. In other words, illuminator 902 may modulate the amplitude of emitted light 906. In such examples, sensor 904 detects returning light 910 from the pulses of light 906 generated by illuminator 902. Range-finding system 900 may then determine a distance to object 908 from which light 906 backscatters based on a delay between when light 906 was emitted and detected and the known speed of light in air). In some examples, rather than (or in addition to) modulating the amplitude of the emitted light 906, illuminator 902 may modulate the phase of the emitted light 1404. In such examples, sensor 904 may detect the phase of returning light 910 from object 908 and determine distances to points on object 908 using the speed of light and based on time differences between when illuminator 902 generated light 906 at a specific phase and when sensor 904 detected returning light 910 at the specific phase.

In other examples, a point cloud may be generated without using illuminator 902. For instance, in some examples, sensor 904 of range-finding system 900 may include two or more optical cameras. In such examples, range-finding system 900 may use the optical cameras to capture stereo images of the environment, including object 908. Range-finding system 900 (e.g., point cloud generator 920) may then calculate the disparities between locations in the stereo images. Range-finding system 900 may then use the disparities to determine distances to the locations shown in the stereo images. From these distances, point cloud generator 920 may generate a point cloud.

Sensors 904 may also detect other attributes of object 908, such as color and reflectance information. In the example of FIG. 9, a point cloud generator 920 may generate a point cloud based on signals 918 generated by sensor 904. Range-finding system 900 and/or point cloud generator 920 may form part of data source 104 (FIG. 1).

Figure 10:
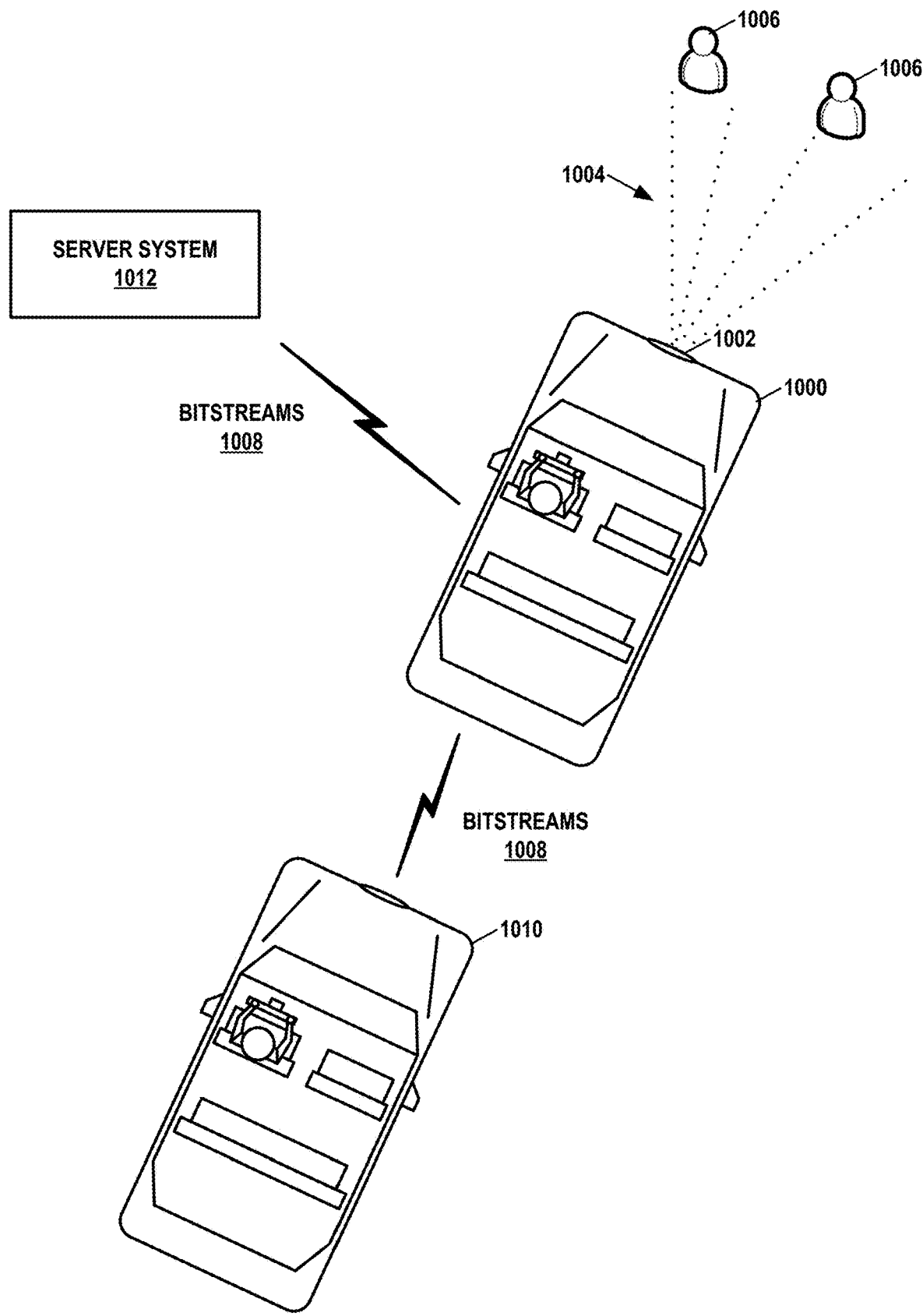
FIG. 10 is a conceptual diagram illustrating an example vehicle-based scenario in which one or more techniques of this disclosure may be used.

FIG. 10 is a conceptual diagram illustrating an example vehicle-based scenario in which one or more techniques of this disclosure may be used. In the example of FIG. 10, a vehicle 1000 includes a laser package 1002, such as a LIDAR system. Laser package 1002 may be implemented in the same manner as laser package 600 (FIG. 8). Although not shown in the example of FIG. 10, vehicle 1000 may also include a data source, such as data source 104 (FIG. 1), and a G-PCC encoder, such as G-PCC encoder 200 (FIG. 1). In the example of FIG. 10, laser package 1002 emits laser beams 1004 that reflect off pedestrians 1006 or other objects in a roadway. The data source of vehicle 1000 may generate a point cloud based on signals generated by laser package 1002. The G-PCC encoder of vehicle 1000 may encode the point cloud to generate bitstreams 1008, such as the geometry bitstream of FIG. 2 and the attribute bitstream of FIG. 2. Bitstreams 1008 may include many fewer bits than the uncoded point cloud obtained by the G-PCC encoder. An output interface of vehicle 1000 (e.g., output interface 108 of FIG. 1) may transmit bitstreams 1008 to one or more other devices. Thus, vehicle 1000 may be able to transmit bitstreams 1008 to other devices more quickly than the encoded point cloud data. Additionally, bitstreams 1008 may require less data storage capacity.

The techniques of this disclosure may further reduce the number of bits in bitstreams 1008. For instance, as discussed above, if a current node is encoded using at least one of inter prediction occupancy or planar mask data, single occupancy data need not be encoded for the current node. Avoiding encoding the single occupancy data in these cases may reduce the number of bits in the bitstream, because occupancy for the current node may be more efficiently coded using inter prediction occupancy or planar mask data.

In the example of FIG. 10, vehicle 1000 may transmit bitstreams 1008 to another vehicle 1010. Vehicle 1010 may include a G-PCC decoder, such as G-PCC decoder 300 (FIG. 1). The G-PCC decoder of vehicle 1010 may decode bitstreams 1008 to reconstruct the point cloud. Vehicle 1010 may use the reconstructed point cloud for various purposes. For instance, vehicle 1010 may determine based on the reconstructed point cloud that pedestrians 1006 are in the roadway ahead of vehicle 1000 and therefore start slowing down, e.g., even before a driver of vehicle 1010 realizes that pedestrians 1006 are in the roadway. Thus, in some examples, vehicle 1010 may perform an autonomous navigation operation, generate a notification or warning, or perform another action based on the reconstructed point cloud.

Additionally or alternatively, vehicle 1000 may transmit bitstreams 1008 to a Server system 1012. Server system 1012 may use bitstreams 1008 for various purposes. For example, server system 1012 may store bitstreams 1008 for subsequent reconstruction of the point clouds. In this example, server system 1012 may use the point clouds along with other data (e.g., vehicle telemetry data generated by vehicle 1000) to train an autonomous driving system. In other examples, server system 1012 may store bitstreams 1008 for subsequent reconstruction for forensic crash investigations (e.g., if vehicle 1000 collides with pedestrians 1006).

Figure 11:
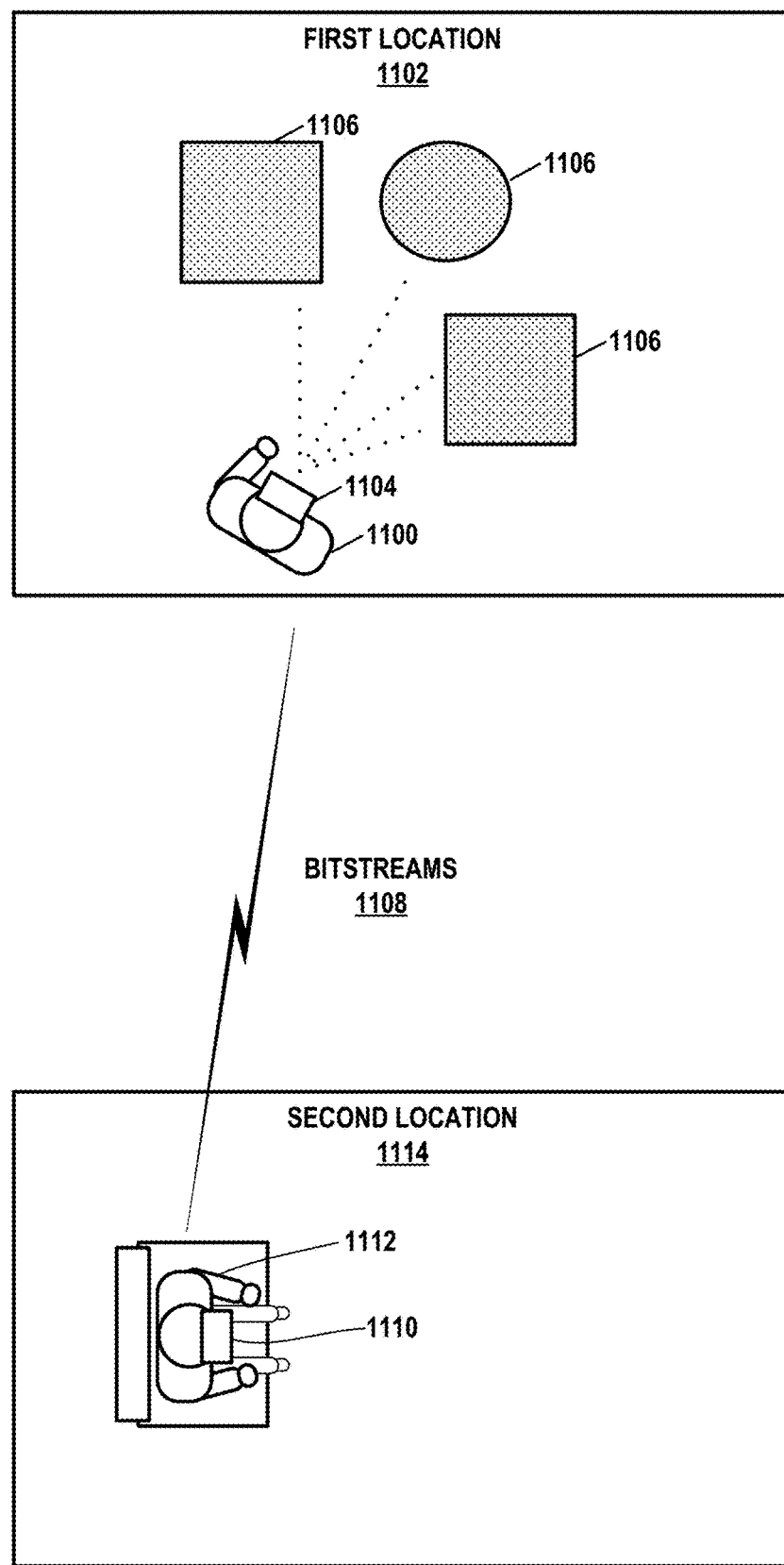
FIG. 11 is a conceptual diagram illustrating an example extended reality system in which one or more techniques of this disclosure may be used.

FIG. 11 is a conceptual diagram illustrating an example extended reality system in which one or more techniques of this disclosure may be used. Extended reality (XR) is a term used to cover a range of technologies that includes augmented reality (AR), mixed reality (MR), and virtual reality (VR). In the example of FIG. 11, a first user 1100 is located in a first location 1102. User 1100 wears an XR headset 1104. As an alternative to XR headset 1104, user 1100 may use a mobile device (e.g., mobile phone, tablet computer, etc.). XR headset 1104 includes a depth detection sensor, such as a LIDAR system, that detects positions of points on objects 1106 at location 1102. A data source of XR headset 1104 may use the signals generated by the depth detection sensor to generate a point cloud representation of objects 1106 at location 1102. XR headset 1104 may include a G-PCC encoder (e.g., G-PCC encoder 200 of FIG. 1) that is configured to encode the point cloud to generate bitstreams 1108.

The techniques of this disclosure may further reduce the number of bits in bitstreams 1108. For instance, as discussed above, if a current node is encoded using at least one of inter prediction occupancy or planar mask data, single occupancy data need not be encoded for the current node. Avoiding encoding the single occupancy data in these cases may reduce the number of bits in the bitstream, because occupancy for the current node may be more efficiently coded using inter prediction occupancy or planar mask data.

XR headset 1104 may transmit bitstreams 1108 (e.g., via a network such as the Internet) to an XR headset 1110 worn by a user 1112 at a second location 1114. XR headset 1110 may decode bitstreams 1108 to reconstruct the point cloud. XR headset 1110 may use the point cloud to generate an XR visualization (e.g., an AR, MR, VR visualization) representing objects 1106 at location 1102. Thus, in some examples, such as when XR headset 1110 generates a VR visualization, user 1112 at location 1114 may have a 3D immersive experience of location 1102. In some examples, XR headset 1110 may determine a position of a virtual object based on the reconstructed point cloud. For instance, XR headset 1110 may determine, based on the reconstructed point cloud, that an environment (e.g., location 1102) includes a flat surface and then determine that a virtual object (e.g., a cartoon character) is to be positioned on the flat surface. XR headset 1110 may generate an XR visualization in which the virtual object is at the determined position. For instance, XR headset 1110 may show the cartoon character sitting on the flat surface.

Figure 12:
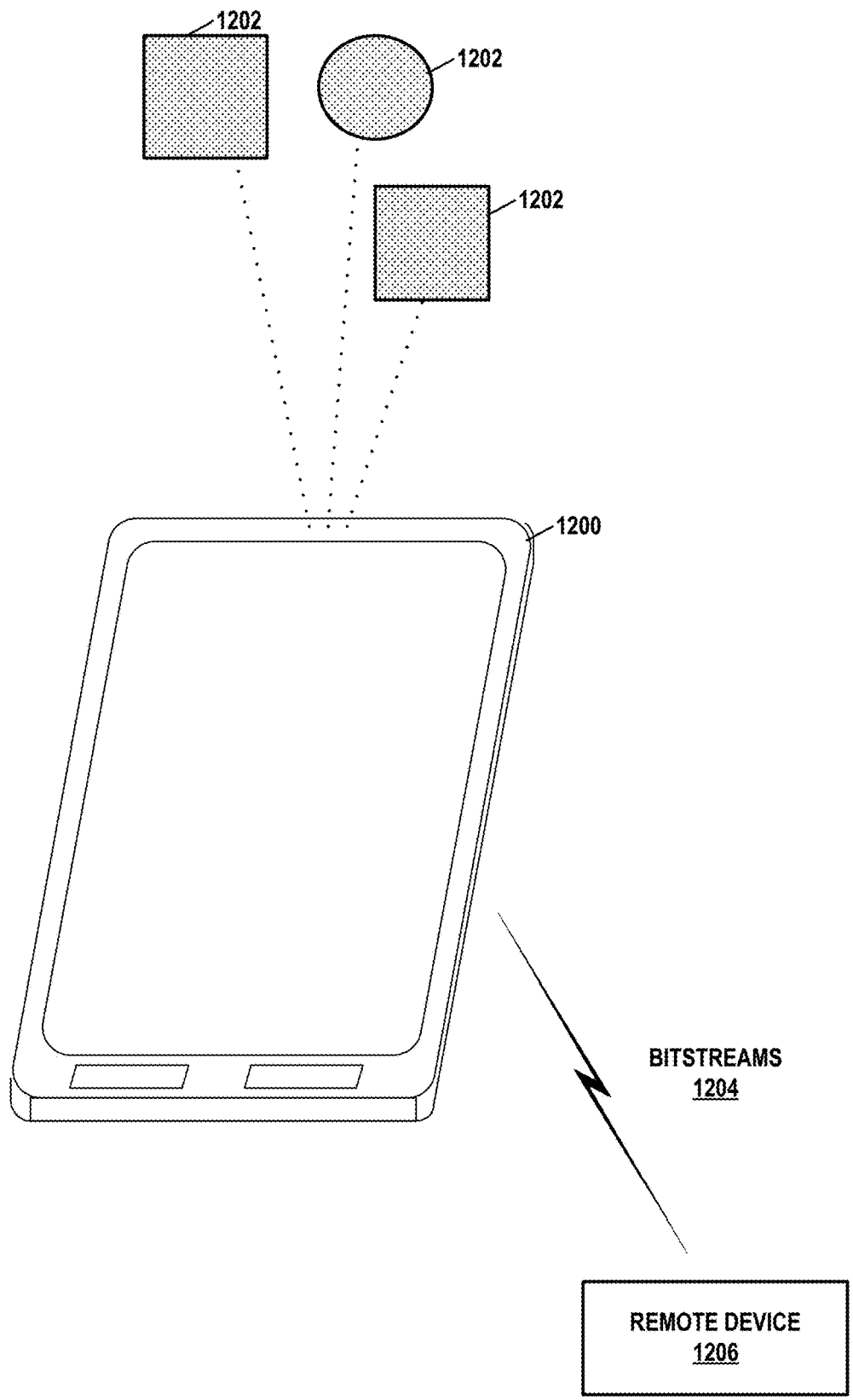
FIG. 12 is a conceptual diagram illustrating an example mobile device system in which one or more techniques of this disclosure may be used.

FIG. 12 is a conceptual diagram illustrating an example mobile device system in which one or more techniques of this disclosure may be used. In the example of FIG. 12, a mobile device 1200, such as a mobile phone or tablet computer, includes a depth detection sensor, such as a LIDAR system, that detects positions of points on objects 1202 in an environment of mobile device 1200. A data source of mobile device 1200 may use the signals generated by the depth detection sensor to generate a point cloud representation of objects 1202. Mobile device 1200 may include a G-PCC encoder (e.g., G-PCC encoder 200 of FIG. 1) that is configured to encode the point cloud to generate bitstreams 1204.

In the example of FIG. 12, mobile device 1200 may transmit bitstreams to a remote device 1206, such as a server system or other mobile device. Remote device 1206 may decode bitstreams 1204 to reconstruct the point cloud. Remote device 1206 may use the point cloud for various purposes. For example, remote device 1206 may use the point cloud to generate a map of an environment of mobile device 1200. For instance, remote device 1206 may generate a map of an interior of a building based on the reconstructed point cloud. In another example, remote device 1206 may generate imagery (e.g., computer graphics) based on the point cloud. For instance, remote device 1206 may use points of the point cloud as vertices of polygons and use color attributes of the points as the basis for shading the polygons. In some examples, remote device 1206 may perform facial recognition using the point cloud.

Figure 13:
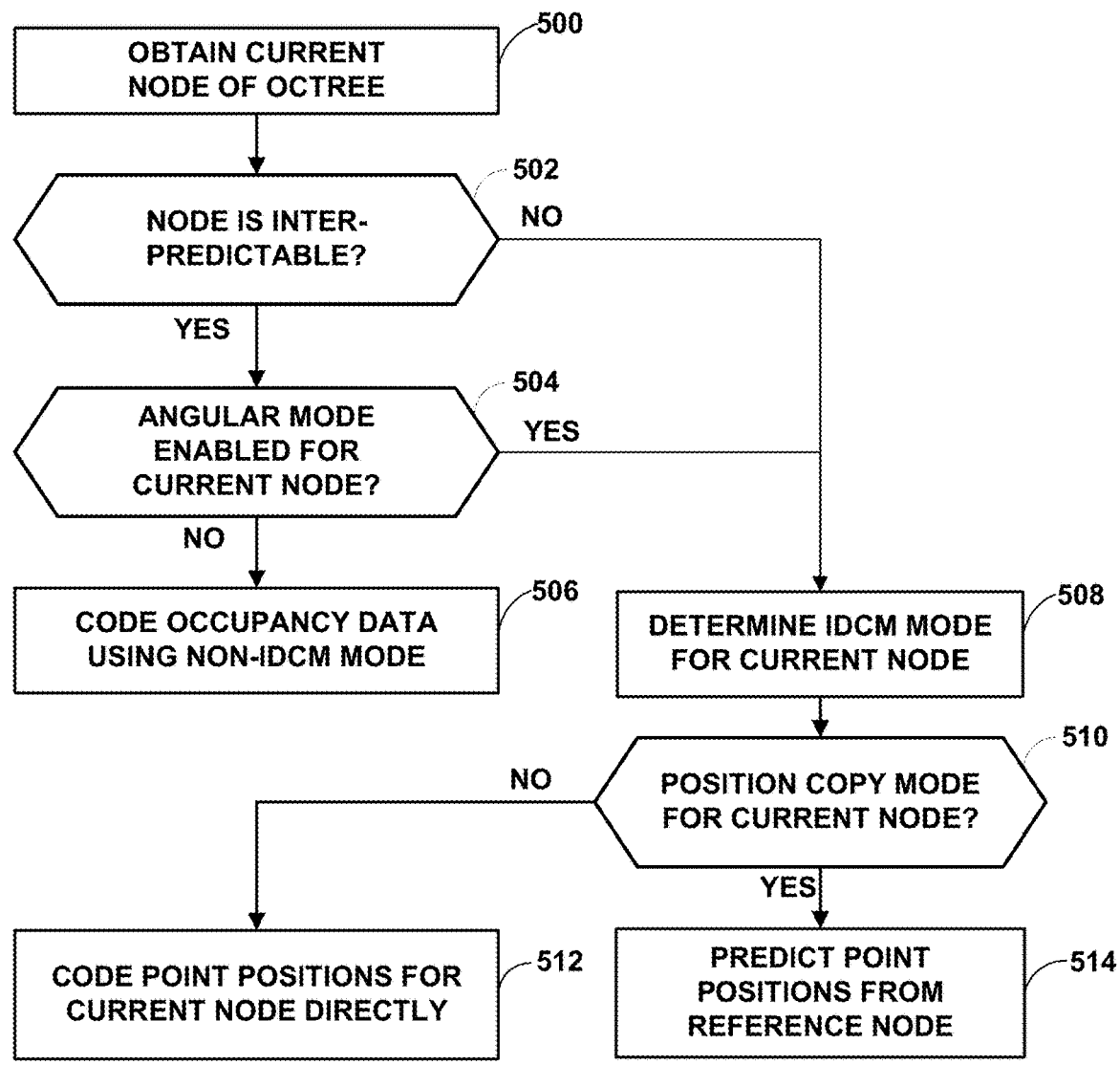
FIG. 13 is a flowchart illustrating an example method of encoding point cloud data according to the techniques of this disclosure.

FIG. 13 is a flowchart illustrating an example method of coding point cloud data according to the techniques of this disclosure. The method of FIG. 13 may be performed by G-PCC encoder 200, during a point cloud encoding process, or G-PCC decoder 300, during a point cloud decoding process. For purposes of example and explanation, the method of FIG. 13 is explained with respect to G-PCC decoder 300, though G-PCC encoder 200 may perform this or a similar method as well.

Initially, G-PCC decoder 300 may obtain a current node of an octree of point cloud data (500). For example, G-PCC decoder 300 may extract data for the octree from a bitstream and decode nodes of the octree reciprocally, starting with a root node. When performed by G-PCC encoder 200, G-PCC encoder 200 may encode the octree reciprocally, starting with the root node.

G-PCC decoder 300 may partition each occupied node into eight sub-nodes, as shown in, e.g., FIGS. 6 and 7. G-PCC decoder 300 may determine, for the current node, whether the node is inter predictable (502). For example, G-PCC decoder 300 may determine a number of sibling nodes that missed predictions and whether this number is less than or equal to a threshold (TH). A node may miss prediction when its occupancy differs from that of a reference node for the node. For example, if the node is actually occupied when the reference node is not occupied, or if the node is actually not occupied when the reference node is occupied, the node may be said to have missed prediction. If a current node has five or fewer siblings for which prediction was missed, the node may be considered to be inter predictable. Otherwise, if the current node has more than five siblings for which prediction was missed, the node may be considered to not be inter predictable.

If the number of sibling nodes that missed predictions is less than or equal to the threshold value ("YES" branch of 502), that is, if the current node is inter predictable, G-PCC decoder 300 may further determine whether angular mode is enabled for the current node (504). G-PCC decoder 300 may, for example, determine a value of a syntax element (e.g., geometry_angular_enabled_flag) indicating whether angular mode is enabled for the current node. Alternatively, G-PCC decoder 300 may receive a configuration file indicating whether angular mode is enabled. G-PCC encoder 200 may perform a rate-distortion optimization (RDO) procedure to determine whether to enable angular mode for the current node, and set the value of the syntax element accordingly.

If both the number of siblings that missed prediction is less than or equal to the threshold (i.e., that the current node is inter predictable) ("YES" branch of 502) and angular mode is not enabled for the current node ("NO" branch of 504), G-PCC decoder 300 may decode the occupancy data for the current node using a non-IDCM mode (506), such as inter prediction. That is, inter prediction may generally be more efficient than IDCM mode, and therefore, if inter prediction is available and angular mode is not, G-PCC decoder 300 may use inter prediction to decode the occupancy data of the current node. For example, G-PCC decoder 300 may determine a context for entropy decoding a value indicating whether the current node is occupied according to whether a reference node to the current node was occupied, then entropy decode the value using the determined context.

However, if either the number of siblings that missed prediction is greater than the threshold (i.e., the current node is not inter predictable) ("NO" branch of 502) or angular mode is enabled for the current node ("YES" branch of 504), G-PCC decoder 300 may determine that IDCM mode is enabled for the current node. In some cases, when both IDCM mode is enabled and the current node is inter predictable, G-PCC decoder 300 may further decode a value indicating whether the current node is coded using IDCM or inter prediction. Assuming that the current node is coded using IDCM mode, G-PCC decoder 300 may decode occupancy data using the IDCM mode. G-PCC encoder 200 may, for example, perform a RDO process to determine whether IDCM or inter prediction achieves better RDO performance, and determine to encode occupancy data of the current node using the one of IDCM or inter prediction that has better RDO performance, and further encode a value indicating whether the occupancy data of the current node is encoded using inter prediction or IDCM accordingly.

In the example of FIG. 13, G-PCC decoder 300 may further determine whether the IDCM mode is a position copy mode for the current node (508), e.g., regular IDCM mode or position copy mode. If the position copy mode is not to be used ("NO" branch of 510), G-PCC decoder 300 may decode occupancy data directly, i.e., the occupancy data may indicate point positions for the current mode directly (512). On the other hand, if the position copy mode is to be used ("YES" branch of 510), G-PCC decoder 300 may predict the point positions for the current node from a reference node (514). In some examples, the current node may inherit the point positions of the reference node directly, whereas in other examples, G-PCC decoder 300 may decode residual values representing position offsets to be applied to the positions of the points in the reference node to achieve the point positions in the current node.

In this manner, the method of FIG. 13 represents an example of a method of coding point cloud data including determining at least one of 1) that a node of an octree of point cloud data is not inter predictable or 2) that angular mode is enabled for the node; in response to determining the at least one of 1) that the node is not inter predictable or 2) that angular mode is enabled for the node, determining an inferred direct coding mode (IDCM) mode for the node; and coding occupancy data of the node using the determined IDCM mode.

Various examples of the techniques of this disclosure are summarized in the following clauses:

Clause 1: A method of coding point cloud data, the method comprising: determining at least one of 1) that a node of an octree of point cloud data is not inter predictable or 2) that angular mode is enabled for the node; in response to determining the at least one of 1) that the node is not inter predictable or 2) that angular mode is enabled for the node, determining an inferred direct coding mode (IDCM) mode for the node; and coding occupancy data of the node using the determined IDCM mode.

Clause 2: The method of clause 1, wherein the node comprises a first node, the method further comprising: determining that a second node of the octree is inter predictable and that angular mode is disabled for the second node; and in response to determining that the second node is inter predictable and that angular mode is disabled for the second node, coding occupancy data of the second node using inter prediction.

Clause 3: The method of clause 1, wherein determining that the node of the octree of point cloud data is not inter predictable comprises determining that a number of sibling nodes of the octree to the node that missed predictions exceeds a threshold value.

Clause 4: The method of clause 1, wherein determining that angular mode is enabled for the node comprises coding a value for a syntax element indicating that angular mode is enabled for the node.

Clause 5: The method of clause 1, wherein coding the occupancy data using the determined IDCM mode comprises coding data representing positions of points in the node.

Clause 6: The method of clause 1, wherein the determined IDCM mode comprises position copy mode, and wherein coding the occupancy data of the node comprises: determining a reference node for the node; determining positions of points in the reference node; and determining the points of the node according to the positions of the points in the reference node.

Clause 7: The method of clause 6, further comprising determining a syntax element has a value indicating that the position copy mode is available.

Clause 8: The method of clause 6, further comprising determining that the position copy mode is available according to a depth of the node in in the octree.

Clause 9: The method of clause 6, further comprising determining that the position copy mode is available according to a number of the points in the reference node.

Clause 10: The method of clause 6, wherein determining the points of the node comprises determining that the points of the node are at the positions of the points in the reference node.

Clause 11: The method of clause 6, wherein determining the points of the node comprises coding position residual values for the points of the node representing position offsets between the positions of the points of the reference node and positions of the points of the node.

Clause 12: The method of clause 1, wherein coding the occupancy data comprises decoding the occupancy data.

Clause 13: The method of clause 1, wherein coding the occupancy data comprises encoding the occupancy data.

Clause 14: A device for coding point cloud data, the device comprising: a memory configured to store point cloud data; and one or more processors implemented in circuitry and configured to: determine at least one of 1) that a node of an octree of the point cloud data is not inter predictable or 2) that angular mode is enabled for the node; in response to determining the at least one of 1) that the node is not inter predictable or 2) that angular mode is enabled for the node, determine an inferred direct coding mode (IDCM) mode for the node; and code occupancy data of the node using the determined IDCM mode.

Clause 15: The device of clause 14, wherein the node comprises a first node, and wherein the one or more processors are further configured to: determine that a second node of the octree is inter predictable and that angular mode is disabled for the second node; and in response to determining that the second node is inter predictable and that angular mode is disabled for the second node, code occupancy data of the second node using inter prediction.

Clause 16: The device of clause 14, wherein to determine that the node of the octree of point cloud data is not inter predictable, the one or more processors are configured to determine that a number of sibling nodes of the octree to the node that missed predictions exceeds a threshold value.

Clause 17: The device of clause 14, wherein to determine that angular mode is enabled for the node, the one or more processors are configured to code a value for a syntax element indicating that angular mode is enabled for the node.

Clause 18: The device of clause 14, wherein to code the occupancy data using the determined IDCM mode, the one or more processors are configured to code data representing positions of points in the node.

Clause 19: The device of clause 14, wherein the determined IDCM mode comprises position copy mode, and wherein to code the occupancy data of the node, the one or more processors are configured to: determine a reference node for the node; determine positions of points in the reference node; and determine the points of the node according to the positions of the points in the reference node.

Clause 20: The device of clause 19, wherein the one or more processors are configured to determine that the points of the node are at the positions of the points in the reference node.

Clause 21: The device of clause 19, wherein to determine the points of the node, the one or more processors are configured to code position residual values for the points of the node representing position offsets between the positions of the points of the reference node and positions of the points of the node.

Clause 22: A computer-readable storage medium having stored thereon instructions that, when executed, cause a processor to: determine at least one of 1) that a node of an octree of point cloud data is not inter predictable or 2) that angular mode is enabled for the node; in response to determining the at least one of 1) that the node is not inter predictable or 2) that angular mode is enabled for the node, determine an inferred direct coding mode (IDCM) mode for the node; and code occupancy data of the node using the determined IDCM mode.

Clause 23: The computer-readable storage medium of clause 22, wherein the node comprises a first node, further comprising instructions that cause the processor to: determine that a second node of the octree is inter predictable and that angular mode is disabled for the second node; and in response to determining that the second node is inter predictable and that angular mode is disabled for the second node, code occupancy data of the second node using inter prediction.

Clause 24: The computer-readable storage medium of clause 22, wherein the instructions that cause the processor to determine that the node of the octree of point cloud data is not inter predictable comprise instructions that cause the processor to determine that a number of sibling nodes of the octree to the node that missed predictions exceeds a threshold value.

Clause 25: The computer-readable storage medium of clause 22, wherein the instructions that cause the processor to determine that angular mode is enabled for the node comprise instructions that cause the processor to code a value for a syntax element indicating that angular mode is enabled for the node.

Clause 26: The computer-readable storage medium of clause 22, wherein the instructions that cause the processor to code the occupancy data using the determined IDCM mode comprise instructions that cause the processor to code data representing positions of points in the node.

Clause 27: The computer-readable storage medium of clause 22, wherein the determined IDCM mode comprises position copy mode, and wherein the instructions that cause the processor to code the occupancy data of the node comprise instructions that cause the processor to: determine a reference node for the node; determine positions of points in the reference node; and determine the points of the node according to the positions of the points in the reference node.

Clause 28: The computer-readable storage medium of clause 27, wherein the instructions that cause the processor to determine the points of the node comprise instructions that cause the processor to determine that the points of the node are at the positions of the points in the reference node.

Clause 29: The computer-readable storage medium of clause 27, wherein the instructions that cause the processor to determine the points of the node comprise instructions that cause the processor to code position residual values for the points of the node representing position offsets between the positions of the points of the reference node and positions of the points of the node.

Clause 30: A device for coding point cloud data, the device comprising: means for determining at least one of 1) that a node of an octree of point cloud data is not inter predictable or 2) that angular mode is enabled for the node; means for determining an inferred direct coding mode (IDCM) mode for the node in response to determining the at least one of 1) that the node is not inter predictable or 2) that angular mode is enabled for the node; and means for coding occupancy data of the node using the determined IDCM mode.

Clause 31: A method of coding point cloud data, the method comprising: determining at least one of 1) that a node of an octree of point cloud data is not inter predictable or 2) that angular mode is enabled for the node; in response to determining the at least one of 1) that the node is not inter predictable or 2) that angular mode is enabled for the node, determining an inferred direct coding mode (IDCM) mode for the node; and coding occupancy data of the node using the determined IDCM mode.

Clause 32: The method of clause 1, wherein the node comprises a first node, the method further comprising: determining that a second node of the octree is inter predictable and that angular mode is disabled for the second node; and in response to determining that the second node is inter predictable and that angular mode is disabled for the second node, coding occupancy data of the second node using inter prediction.

Clause 33: The method of any of clauses 31 and 32, wherein determining that the node of the octree of point cloud data is not inter predictable comprises determining that a number of sibling nodes of the octree to the node that missed predictions exceeds a threshold value.

Clause 34: The method of any of clauses 31-33, wherein determining that angular mode is enabled for the node comprises coding a value for a syntax element indicating that angular mode is enabled for the node.

Clause 35: The method of any of clauses 31-34, wherein coding the occupancy data using the determined IDCM mode comprises coding data representing positions of points in the node.

Clause 36: The method of any of clauses 31-35, wherein the determined IDCM mode comprises position copy mode, and wherein coding the occupancy data of the node comprises: determining a reference node for the node; determining positions of points in the reference node; and determining the points of the node according to the positions of the points in the reference node.

Clause 37: The method of clause 36, further comprising determining a syntax element has a value indicating that the position copy mode is available.

Clause 38: The method of any of clauses 36 and 37, further comprising determining that the position copy mode is available according to a depth of the node in in the octree.

Clause 39: The method of any of clauses 36-38, further comprising determining that the position copy mode is available according to a number of the points in the reference node.

Clause 40: The method of any of clauses 36-39, wherein determining the points of the node comprises determining that the points of the node are at the positions of the points in the reference node.

Clause 41: The method of any of clauses 36-39, wherein determining the points of the node comprises coding position residual values for the points of the node representing position offsets between the positions of the points of the reference node and positions of the points of the node.

Clause 42: The method of any of clauses 31-41, wherein coding the occupancy data comprises decoding the occupancy data.

Clause 43: The method of any of clauses 31-42, wherein coding the occupancy data comprises encoding the occupancy data.

Clause 44: A device for coding point cloud data, the device comprising: a memory configured to store point cloud data; and one or more processors implemented in circuitry and configured to: determine at least one of 1) that a node of an octree of the point cloud data is not inter predictable or 2) that angular mode is enabled for the node; in response to determining the at least one of 1) that the node is not inter predictable or 2) that angular mode is enabled for the node, determine an inferred direct coding mode (IDCM) mode for the node; and code occupancy data of the node using the determined IDCM mode.

Clause 45: The device of clause 44, wherein the node comprises a first node, and wherein the one or more processors are further configured to: determine that a second node of the octree is inter predictable and that angular mode is disabled for the second node; and in response to determining that the second node is inter predictable and that angular mode is disabled for the second node, code occupancy data of the second node using inter prediction.

Clause 46: The device of any of clauses 44 and 45, wherein to determine that the node of the octree of point cloud data is not inter predictable, the one or more processors are configured to determine that a number of sibling nodes of the octree to the node that missed predictions exceeds a threshold value.

Clause 47: The device of any of clauses 44-46, wherein to determine that angular mode is enabled for the node, the one or more processors are configured to code a value for a syntax element indicating that angular mode is enabled for the node.

Clause 48: The device of any of clauses 44-47, wherein to code the occupancy data using the determined IDCM mode, the one or more processors are configured to code data representing positions of points in the node.

Clause 49: The device of any of clauses 44-48, wherein the determined IDCM mode comprises position copy mode, and wherein to code the occupancy data of the node, the one or more processors are configured to: determine a reference node for the node; determine positions of points in the reference node; and determine the points of the node according to the positions of the points in the reference node.

Clause 50: The device of clause 49, wherein the one or more processors are configured to determine that the points of the node are at the positions of the points in the reference node.

Clause 51: The device of clause 49, wherein to determine the points of the node, the one or more processors are configured to code position residual values for the points of the node representing position offsets between the positions of the points of the reference node and positions of the points of the node.

Clause 52: A computer-readable storage medium having stored thereon instructions that, when executed, cause a processor to: determine at least one of 1) that a node of an octree of point cloud data is not inter predictable or 2) that angular mode is enabled for the node; in response to determining the at least one of 1) that the node is not inter predictable or 2) that angular mode is enabled for the node, determine an inferred direct coding mode (IDCM) mode for the node; and code occupancy data of the node using the determined IDCM mode.

Clause 53: The computer-readable storage medium of clause 52, wherein the node comprises a first node, further comprising instructions that cause the processor to: determine that a second node of the octree is inter predictable and that angular mode is disabled for the second node; and in response to determining that the second node is inter predictable and that angular mode is disabled for the second node, code occupancy data of the second node using inter prediction.

Clause 54: The computer-readable storage medium of any of clauses 52 and 53, wherein the instructions that cause the processor to determine that the node of the octree of point cloud data is not inter predictable comprise instructions that cause the processor to determine that a number of sibling nodes of the octree to the node that missed predictions exceeds a threshold value.

Clause 55: The computer-readable storage medium of any of clauses 52-54, wherein the instructions that cause the processor to determine that angular mode is enabled for the node comprise instructions that cause the processor to code a value for a syntax element indicating that angular mode is enabled for the node.

Clause 56: The computer-readable storage medium of any of clauses 52-55, wherein the instructions that cause the processor to code the occupancy data using the determined IDCM mode comprise instructions that cause the processor to code data representing positions of points in the node.

Clause 57: The computer-readable storage medium of any of clauses 52-56, wherein the determined IDCM mode comprises position copy mode, and wherein the instructions that cause the processor to code the occupancy data of the node comprise instructions that cause the processor to: determine a reference node for the node; determine positions of points in the reference node; and determine the points of the node according to the positions of the points in the reference node.

Clause 58: The computer-readable storage medium of clause 57, wherein the instructions that cause the processor to determine the points of the node comprise instructions that cause the processor to determine that the points of the node are at the positions of the points in the reference node.

Clause 59: The computer-readable storage medium of clause 57, wherein the instructions that cause the processor to determine the points of the node comprise instructions that cause the processor to code position residual values for the points of the node representing position offsets between the positions of the points of the reference node and positions of the points of the node.

Clause 60: A device for coding point cloud data, the device comprising: means for determining at least one of 1) that a node of an octree of point cloud data is not inter predictable or 2) that angular mode is enabled for the node; means for determining an inferred direct coding mode (IDCM) mode for the node in response to determining the at least one of 1) that the node is not inter predictable or 2) that angular mode is enabled for the node; and means for coding occupancy data of the node using the determined IDCM mode.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable gate arrays (FPGAs), or other equivalent integrated or discrete logic circuitry. Accordingly, the terms "processor" and "processing circuitry," as used herein may refer to any of the foregoing structures or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of coding point cloud data, the method comprising:
   determining that a first node of an octree of point cloud data is not inter predictable;
   in response to determining that the first node is not inter predictable, determining an inferred direct coding mode (IDCM) mode for the node;
   coding occupancy data of the first node using the determined IDCM mode;
   determining that a second node of the octree is inter predictable and that angular mode is disabled for the second node; and
   in response to determining that the second node is inter predictable and that angular mode is disabled for the second node, coding occupancy data of the second node using inter prediction.

2. The method of claim 1, wherein determining that the first node of the octree of point cloud data is not inter predictable comprises determining that a number of sibling nodes of the octree to the first node that missed predictions exceeds a threshold value.

3. The method of claim 1, further comprising:
   determining that angular mode is enabled for a third node of the octree, wherein determining that angular mode is enabled for the third node comprises coding a value for a syntax element indicating that angular mode is enabled for the third node; and
   in response to determining that angular mode is enabled for the third node, determining an IDCM mode for the third node.

4. The method of claim 1, wherein coding the occupancy data using the determined IDCM mode comprises coding data representing positions of points in the first node.

5. The method of claim 1, wherein the determined IDCM mode comprises position copy mode, and wherein coding the occupancy data of the first node comprises:
   determining a reference node for the first node;
   determining positions of points in the reference node; and
   determining points in the first node according to the positions of the points in the reference node.

6. The method of claim 5, further comprising determining a syntax element has a value indicating that the position copy mode is available for the first node.

7. The method of claim 5, further comprising determining that the position copy mode is available according to a depth of the first node in in the octree.

8. The method of claim 5, further comprising determining that the position copy mode is available according to a number of the points in the reference node.

9. The method of claim 5, wherein determining the points in the first node comprises determining that the points in the first node are at the positions of the points in the reference node.

10. The method of claim 5, wherein determining the points in the first node comprises coding position residual values for the points in the first node representing position offsets between the positions of the points in the reference node and positions of the points in the first node.

11. The method of claim 1, wherein coding the occupancy data comprises decoding the occupancy data.

12. The method of claim 1, wherein coding the occupancy data comprises encoding the occupancy data.

13. A device for coding point cloud data, the device comprising:
   a memory configured to store point cloud data; and
   one or more processors implemented in circuitry and configured to:
      determine that a first node of an octree of the point cloud data is not inter predictable;
      in response to determining that the first node is not inter predictable, determine an inferred direct coding mode (IDCM) mode for the first node;
      code occupancy data of the first node using the determined IDCM mode;
      determine that a second node of the octree is inter predictable and that angular mode is disabled for the second node; and
      in response to determining that the second node is inter predictable and that angular mode is disabled for the second node, code occupancy data of the second node using inter prediction.

14. The device of claim 13, wherein to determine that the first node of the octree of point cloud data is not inter predictable, the one or more processors are configured to determine that a number of sibling nodes of the octree to the first node that missed predictions exceeds a threshold value.

15. The device of claim 13, wherein the one or more processors are further configured to:
   determine that angular mode is enabled for a third node of the octree, wherein to determine that angular mode is enabled for the third node, the one or more processors are configured to code a value for a syntax element indicating that angular mode is enabled for the third node; and
   in response to determining that angular mode is enabled for the third node, determining an IDCM mode for the third node.

16. The device of claim 13, wherein to code the occupancy data using the determined IDCM mode, the one or more processors are configured to code data representing positions of points in the first node.

17. The device of claim 13, wherein the determined IDCM mode comprises position copy mode, and wherein to code the occupancy data of the first node, the one or more processors are configured to:
   determine a reference node for the first node;
   determine positions of points in the reference node; and
   determine points in the first node according to the positions of the points in the reference node.

18. The device of claim 17, wherein the one or more processors are configured to determine that the points in the first node are at the positions of the points in the reference node.

19. The device of claim 17, wherein to determine the points in the first node, the one or more processors are configured to code position residual values for the points in the first node representing position offsets between the positions of the points in the reference node and positions of the points in the first node.

20. The device of claim 17, wherein the one or more processors are configured to determine a syntax element has a value indicating that the position copy mode is available for the first node.

21. The device of claim 17, wherein the one or more processors are configured to determine that the position copy mode is available according to a depth of the first node in in the octree.

22. A non-transitory computer-readable storage medium having stored thereon instructions that, when executed, cause a processor to:
   determine that a first node of an octree of point cloud data is not inter predictable;
   in response to determining that the first node is not inter predictable, determine an inferred direct coding mode (IDCM) mode for the first node;
   code occupancy data of the first node using the determined IDCM mode;
   determine that a second node of the octree is inter predictable and that angular mode is disabled for the second node; and
   in response to determining that the second node is inter predictable and that angular mode is disabled for the second node, code occupancy data of the second node using inter prediction.

* * * * *